United States Patent
Kang et al.

(10) Patent No.: US 10,379,507 B2
(45) Date of Patent: Aug. 13, 2019

(54) VOICE CONTROL TYPE BATH SYSTEM AND OPERATING METHOD THEREOF

(71) Applicant: DARTPOINT TECH. CO., LTD., Taipei (TW)

(72) Inventors: Chi-Lin Kang, New Taipei (TW); Chao-Yuan Huang, Taipei (TW)

(73) Assignee: DARTPOINT TECH. CO., LTD., Taipei (TW)

( * ) Notice: Subject to any disclaimer, the term of this patent is extended or adjusted under 35 U.S.C. 154(b) by 240 days.

(21) Appl. No.: 15/361,019

(22) Filed: Nov. 24, 2016

(65) Prior Publication Data

US 2017/0160710 A1 Jun. 8, 2017

Related U.S. Application Data

(60) Provisional application No. 62/264,345, filed on Dec. 8, 2015.

(30) Foreign Application Priority Data

Jun. 30, 2016 (TW) .............................. 105120759 A

(51) Int. Cl.
*G05B 19/04* (2006.01)
*G10L 15/22* (2006.01)
(Continued)

(52) U.S. Cl.
CPC ............ *G05B 19/041* (2013.01); *G10L 15/22* (2013.01); *H04M 1/271* (2013.01);
(Continued)

(58) Field of Classification Search
CPC ........ G05B 19/041; G05B 2219/23386; G10L 15/22; G10L 15/30; G10L 2015/223; H04M 1/271; H04M 1/6041
See application file for complete search history.

(56) References Cited

U.S. PATENT DOCUMENTS 5,086,385 A 2/1992 Launey et al.
2011/0031331 A1 2/2011 Klicpera
(Continued)

FOREIGN PATENT DOCUMENTS

CA 1245745 11/1988
CN 201239069 Y 5/2009
(Continued)

*Primary Examiner* — Phuc T Dang
(74) *Attorney, Agent, or Firm* — Mark M. Friedman

(57) ABSTRACT

A voice control type bath system and an operating method thereof are disclosed. The voice control type bath system is utilized for a massage bath equipment and includes at least one attached device for actuating the massage bath equipment, a voice receiving unit for receiving at least one voice signal, a voice analyzing module for analyzing the at least one voice signal to generate at least one controlling command; and a main control device for controlling the at least one attached device to actuate the massage bath equipment according to the at least one controlling command and/or for controlling an actuation of the at least one attached device according to the at least one controlling command. The voice control type bath system and the operating method thereof can directly control the at least one attached device via the at least one voice signal.

46 Claims, 24 Drawing Sheets

(51) Int. Cl.
*H04M 1/27* (2006.01)
*H04M 1/60* (2006.01)
*G10L 15/30* (2013.01)

(52) U.S. Cl.
CPC .... *G05B 2219/23386* (2013.01); *G10L 15/30* (2013.01); *G10L 2015/223* (2013.01); *H04M 1/6041* (2013.01)

(56) References Cited

U.S. PATENT DOCUMENTS

| | | | |
|---|---|---|---|
| 2012/0233765 A1 | 9/2012 | Altman | |
| 2013/0173266 A1* | 7/2013 | Nishino | G10L 17/00 704/236 |
| 2015/0335523 A1* | 11/2015 | Kang | A61H 33/005 4/541.1 |
| 2015/0335524 A1* | 11/2015 | Kang | A61H 33/005 702/183 |
| 2016/0217791 A1* | 7/2016 | Togawa | G10L 17/005 |

FOREIGN PATENT DOCUMENTS

| | | |
|---|---|---|
| CN | 104135308 A | 11/2014 |
| CN | 203964332 U | 11/2014 |
| CN | 104976781 A | 10/2015 |
| CN | 105011824 | 11/2015 |
| DE | 29910856 | 12/1999 |
| EP | 1174780 | 1/2002 |
| ES | 2245546 | 1/2006 |
| JP | 068700 | 2/1994 |
| JP | 2009092693 A | 4/2009 |
| JP | 2009109587 A | 5/2009 |
| TW | 465882 | 11/2013 |
| TW | 201544062 A | 12/2015 |

* cited by examiner

VOICE CONTROL TYPE BATH SYSTEM AND OPERATING METHOD THEREOF

CROSS REFERENCE TO RELATED APPLICATION

This patent application claims priority of U.S. Provisional Application Ser. No. 62/264,345, entitled "Several Controlling Systems for bathing system and methods related to the controlling Systems", which is filed on Dec. 8, 2015, incorporated herein by reference.

BACKGROUND OF THE INVENTION

Field of Invention

The present invention relates to a voice control field, and more particularly to a voice control type bath system and an operating method thereof.

Description of Prior Art

A conventional bath system is operated manually. When a user utilizes the bath system and needs to change settings of various attached devices in the bath system, the user has to move to an operating panel of the bath system and then changes the settings by operating at least one button. This is inconvenient for the user. There is no application to control various attached devices via at least one voice signal in the conventional bath system. For example, after the bath system receives and converts a voice command from the user, the bath system controls the various attached devices to perform specific actuations according to the voice command. If the user can change the at least one setting of the various attached devices via the voice command, the user need not move to the operating panel to operate the at least one button.

Furthermore, in the conventional bath system, it is inconvenient for the user to hold a mobile phone to answer or dial a phone call. It is more convenient if the phone call is answered or dialed by utilizing at least one voice signal via the bath system (i.e. it is not required to hold the mobile phone to answer or dial the phone call).

Consequently, there is a need to provide a control method, which is simpler, more humanized, and more intuitive, to solve the above-mentioned problems in the prior art.

SUMMARY OF THE INVENTION

The present invention provides a voice control type bath system and an operating method thereof which can control various attached devices by a method which is simpler and more intuitive.

A voice control type bath system of the present invention is utilized for a massage bath equipment. The voice control type bath system includes at least one attached device utilized for actuating the massage bath equipment; a voice receiving unit utilized for receiving at least one voice signal; a voice analyzing module coupled to the voice receiving unit and utilized for analyzing the at least one voice signal to generate at least one controlling command; and a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module.

An operating method of a voice control type bath system of the present invention is utilized for a massage bath equipment. The voice control type bath system includes at least one attached device, a voice receiving unit, a voice analyzing module, and a main control device. The operating method of the voice control type bath system includes receiving at least one voice signal by the voice receiving unit; analyzing the at least one voice signal to generate at least one controlling command by the voice analyzing module; and controlling the at least one attached device to actuate the massage bath equipment according to the at least one controlling command of the voice analyzing module and/or controlling an actuation of the attached device according to the at least one controlling command of the voice analyzing module.

A voice receiving unit of the present invention is utilized for a voice control type bath system. The voice receiving unit includes at least one microphone utilized for receiving at least one voice signal; a processing unit electrically connected to the at least one microphone and generating at least one controlling information corresponding to the at least one voice signal; and a wireless communication unit utilized for converting the at least one controlling information into at least one wireless signal and transmitting the at least one wireless signal to the voice control type bath system.

The voice control type bath system and the operating method thereof in accordance with the present invention can control various attached device in the bath system via the at least one voice signal.

DETAILED DESCRIPTION OF THE PREFERRED EMBODIMENTS

Figure 1:
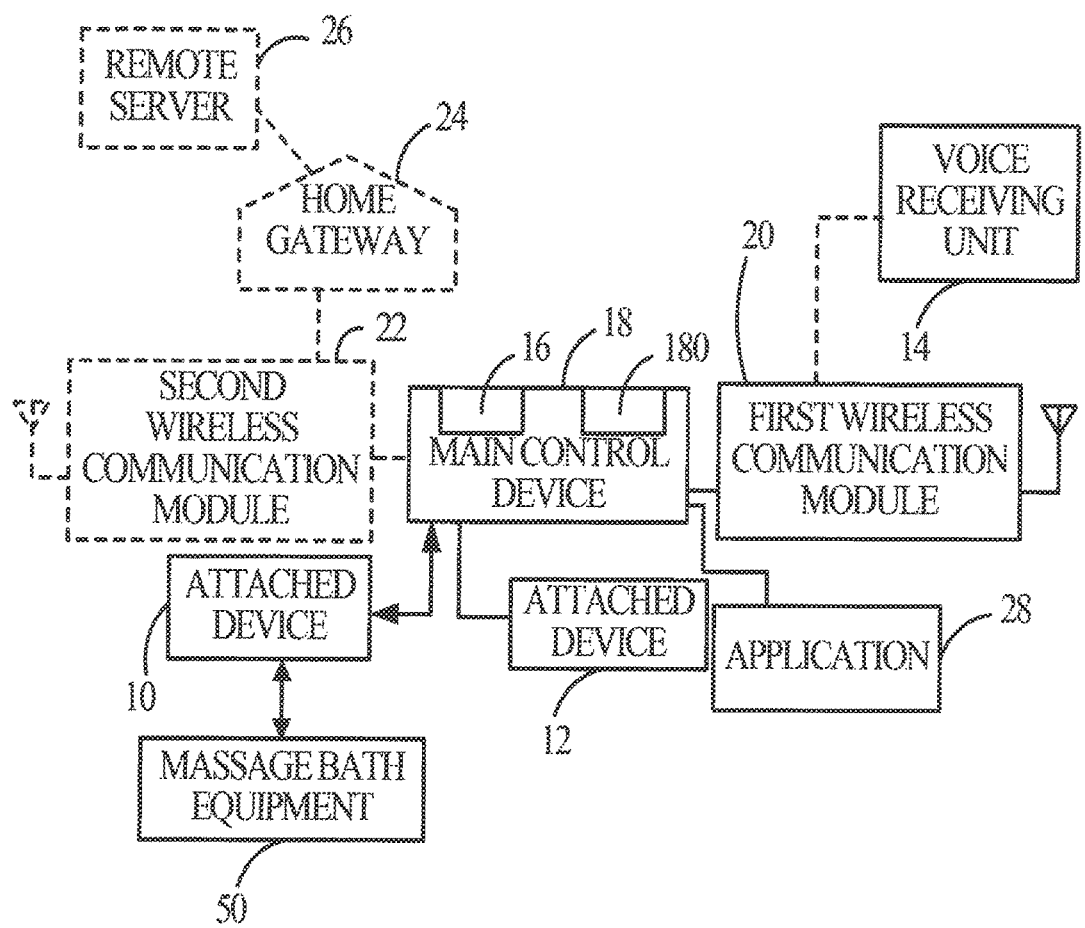
FIG. 1 is a block diagram of a voice control type bath system in accordance with a first embodiment of the present invention.

Please refer to FIG. 1. FIG. 1 is a block diagram of a voice control type bath system in accordance with a first embodiment of the present invention.

The voice control type bath system is utilized for a massage bath equipment 50 and includes at least one attached device 10, 12, a voice receiving unit 14, a voice analyzing module 16, and a main control device 18.

The attached device 10 is coupled to the main control device 18 and utilized for actuating the massage bath equipment 50. The voice receiving unit 14 is utilized for receiving at least one voice signal. The voice analyzing module 16 is coupled to the voice receiving unit 14 and utilized for analyzing the at least one voice signal to generate a controlling command. The main control device 18 includes the voice analyzing module 16, and is coupled to the attached device 10 and utilized for controlling the attached device 10 to actuate the massage bath equipment 50 according to the at least one controlling command and/or for controlling an actuation of the attached device 12 according to the at least one controlling command. The attached device 12 may be but not limited to an audio and video device or a lighting device.

In the present embodiment, the main control device 18 includes a control unit 180. The control unit 180 is utilized for controlling the attached device 10 to actuate the massage bath equipment 50 according to the at least one controlling command.

The voice control type bath system further includes a first wireless communication module 20. The voice analyzing module 16 is disposed in the main control device 18. The voice analyzing module 16 receives the at least one voice signal via the first wireless communication module 20.

The voice control type bath system further includes a second wireless communication module 22. The main control device 18 is wirelessly connected to a remote server 26 via the second wireless communication module 22 and a home gateway 24. Cloud music may be stored in the remote server 26.

The voice control type bath system further includes at least one application (APP) 28. The main control device 18 executes the at least one application 28 according to the at least one controlling command. The at least one application 28 may be but not limited to an application of a multimedia player or an application with any other function.

In the present embodiment, the voice receiving unit 14 has a floatable structure, a movable structure, or a fixable structure, and the voice receiving unit 14 is disposed adjacent to the massage bath equipment 50. More particularly, the voice receiving unit 14 can be floated on the water, moved by a user, or fixed at a specific position.

Furthermore, in another embodiment, the voice analyzing module 16 can be disposed in the remote server 26. The main control device 18 receives the at least one voice signal via the first wireless communication module 20. The main control device 18 transmits the at least one voice signal to the remote server 26. After the voice analyzing module 16 generates the at least one controlling command, the remote server 26 transmits the at least one controlling command to the main control device 18.

Figure 2:
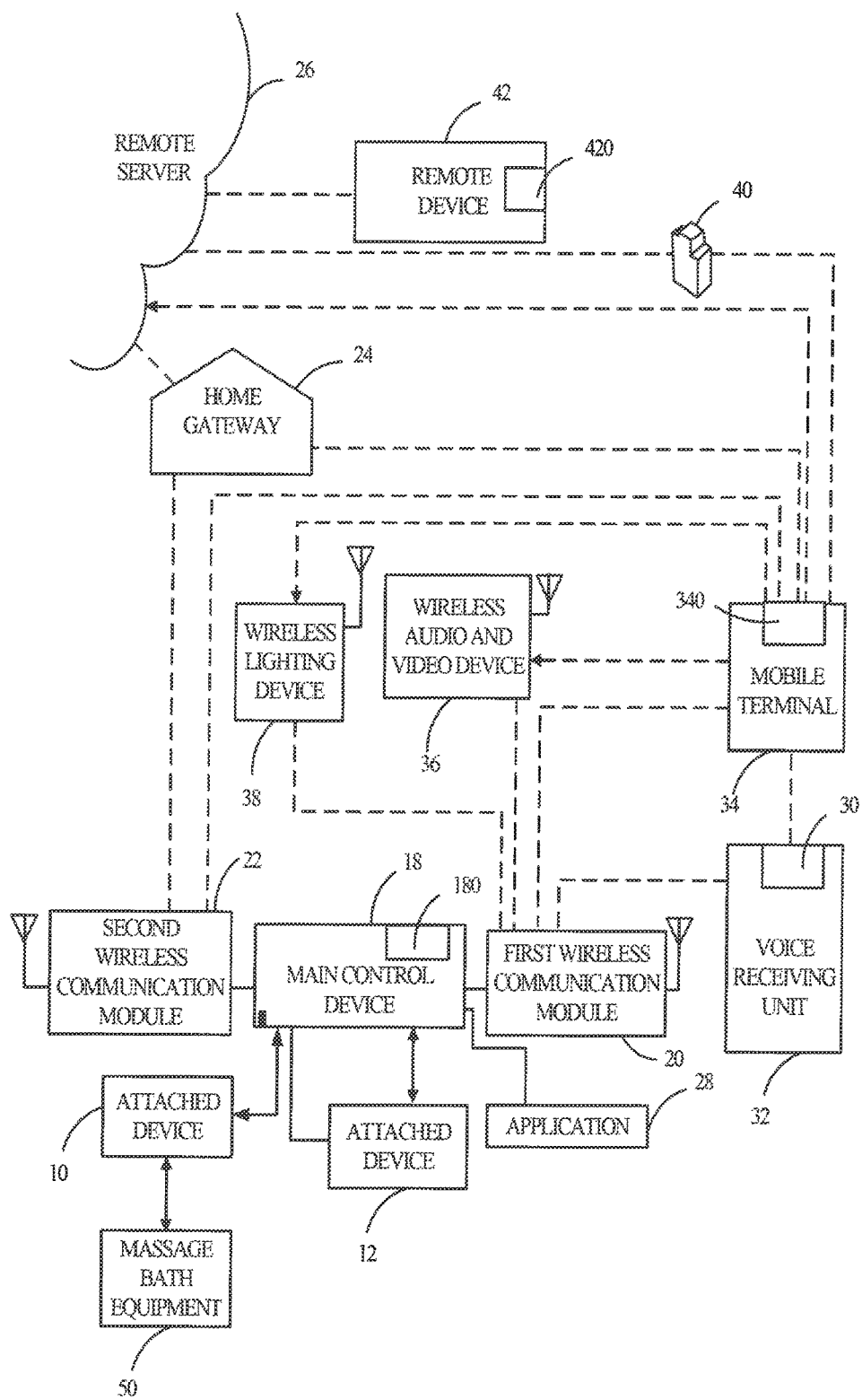
FIG. 2 is a block diagram of a voice control type bath system in accordance with a second embodiment of the present invention.

Please refer to FIG. 2. FIG. 2 is a block diagram of a voice control type bath system in accordance with a second embodiment of the present invention.

In the present embodiment, a voice analyzing module 30 is disposed in a voice receiving unit 32. The voice analyzing module 30 analyzes at least one voice signal to generate at least one controlling command. The main control device 18 (or the control unit 180) receives the at least one controlling command via the first wireless communication module 20. The voice receiving unit 14 has a floatable structure, a movable structure, or a fixable structure, and the voice receiving unit 14 is disposed adjacent to the massage bath equipment 50.

In the present embodiment, the voice control type bath system further includes a mobile terminal 34. At least one user application 340 is stored in the mobile terminal 34.

In the present embodiment, the voice control type bath system further includes a wireless audio and video device 36 and a wireless lighting device 38. The mobile terminal 34 is utilized for wirelessly connecting to the voice receiving unit 32 and generating at least one voice signal. The main control device 18 (or the control unit 180) can wirelessly control the wireless audio and video device 36 and the wireless lighting device 38 via the first wireless communication module 20. Furthermore, the mobile terminal 34 can wirelessly control the wireless audio and video device 36 and the wireless lighting device 38 as well.

In the present embodiment, the voice control type bath system further includes a wireless access point (WAP). The mobile terminal 34 can directly connect to the remote server 26 or connect to the remote server 26 via the wireless access point 40.

In the present embodiment, the voice control type bath system further includes a remote device 42. A remote diagnosis system application (RDS APP) is stored in the remote device 42.

Furthermore, in another embodiment, the voice analyzing module 30 can be disposed in the remote server 26. The main control device 18 receives the at least one voice signal via the first wireless communication module 20. The main control device 18 transmits the at least one voice signal to the remote server 26. After the voice analyzing module 30 generates the at least one controlling command, the remote server 26 transmits the at least one controlling command to the main control device 18.

Moreover, after the voice receiving unit 32 receives the at least one voice signal, the voice analyzing module 30 analyzes the at least one voice signal to generate the at least one controlling command. The mobile terminal 34 answers or dials a phone call and/or plays music according to the at least one controlling command.

Figure 3:
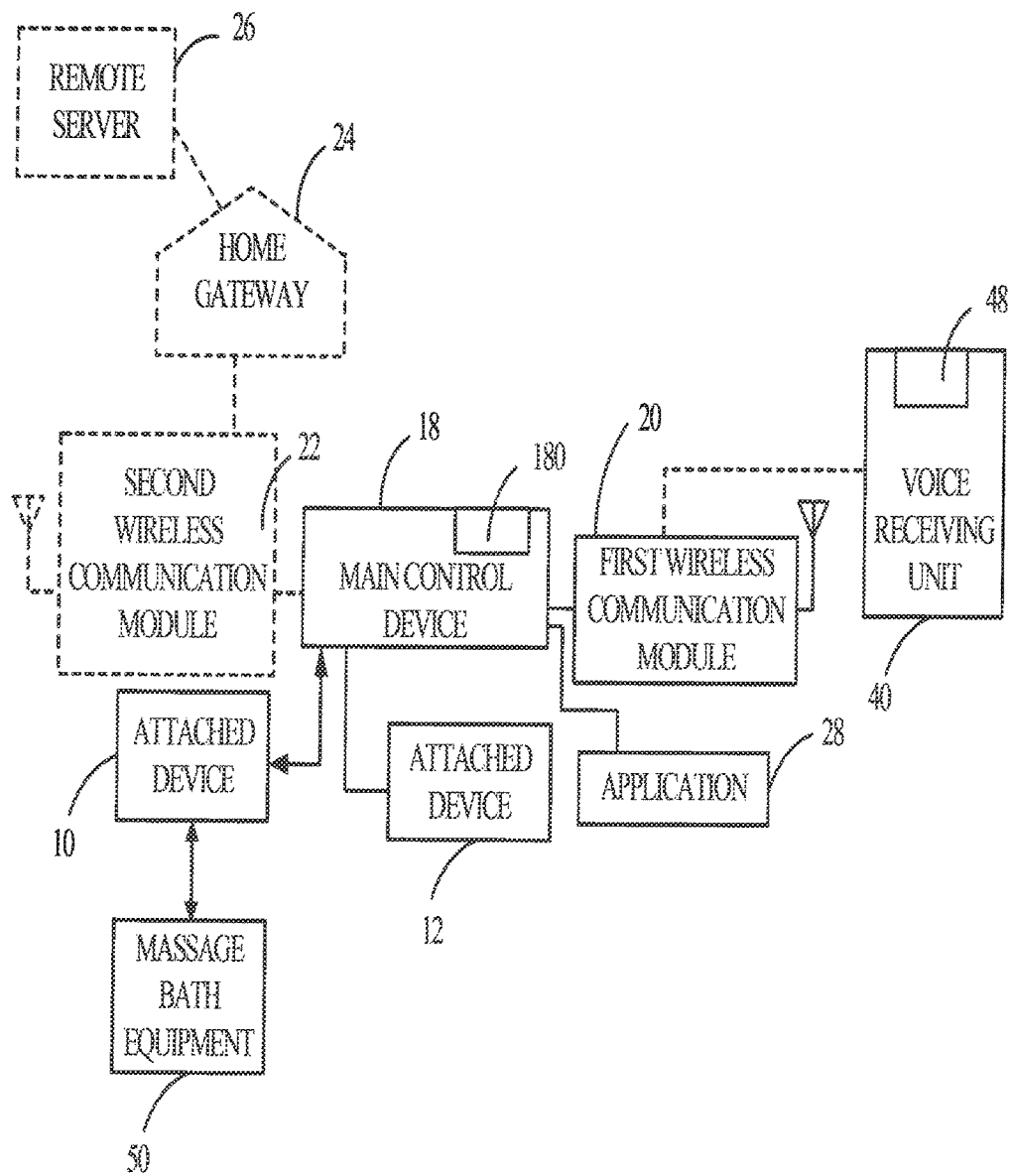
FIG. 3 is a block diagram of a voice control type bath system in accordance with a third embodiment of the present invention.

Please refer to FIG. 3. FIG. 3 is a block diagram of a voice control type bath system in accordance with a third embodiment of the present invention.

A difference between the present embodiment and the embodiment in FIG. 1 is that a voice analyzing module 48 is disposed in a voice receiving unit 40 in the present embodiment. In the embodiment in FIG. 1, the voice analyzing module 16 is disposed in the main control device 18. The voice receiving unit 40 has a floatable structure, a movable structure, or a fixable structure, and the voice receiving unit 40 is disposed adjacent to the massage bath equipment 50.

Furthermore, in another embodiment, the voice analyzing module 48 can be disposed in the remote server 26. The main control device 18 receives the at least one voice signal via the first wireless communication module 20. The main control device 18 transmits the at least one voice signal to the remote server 26. After the voice analyzing module 48 generates the at least one controlling command, the remote server 26 transmits the at least one controlling command to the main control device 18.

Figure 4:
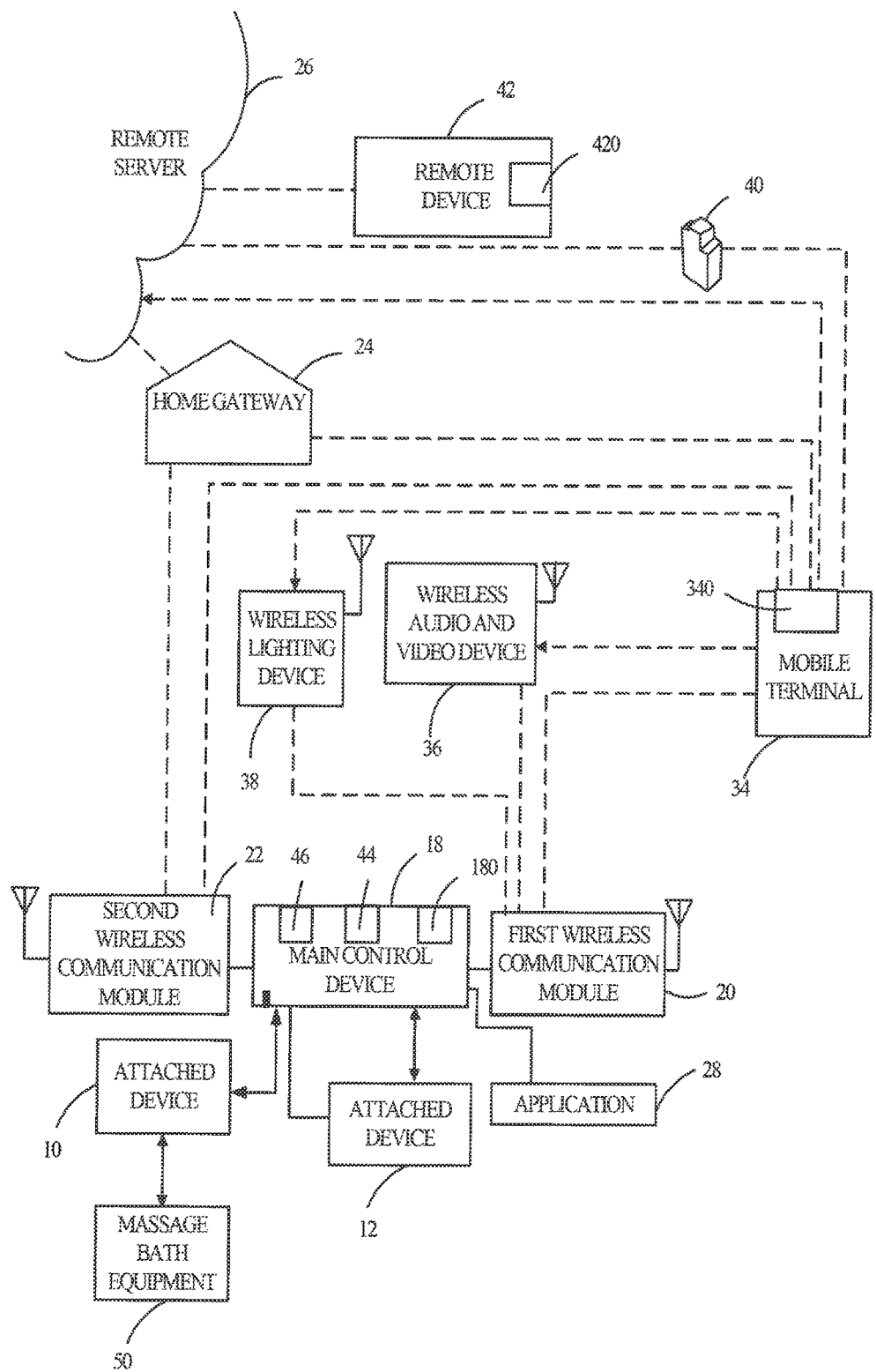
FIG. 4 is a block diagram of a voice control type bath system in accordance with a fourth embodiment of the present invention.

Please refer to FIG. 4. FIG. 4 is a block diagram of a voice control type bath system in accordance with a fourth embodiment of the present invention.

A difference between the present embodiment and the embodiment in FIG. 2 is that a voice analyzing module 44 and a voice receiving unit 46 are disposed in the main control device 18 in the present embodiment. In the embodiment in FIG. 2, the voice analyzing module 30 is disposed in the voice receiving unit 32.

Furthermore, in another embodiment, the voice analyzing module 44 may be disposed in the remote server 26. The main control device 18 receives the at least one voice signal via the first wireless communication module 20. The main control device 18 transmits the at least one voice signal to the remote server 26. After the voice analyzing module 44 generates the at least one controlling command, the remote server 26 transmits the at least one controlling command to the main control device 18.

Figure 5:
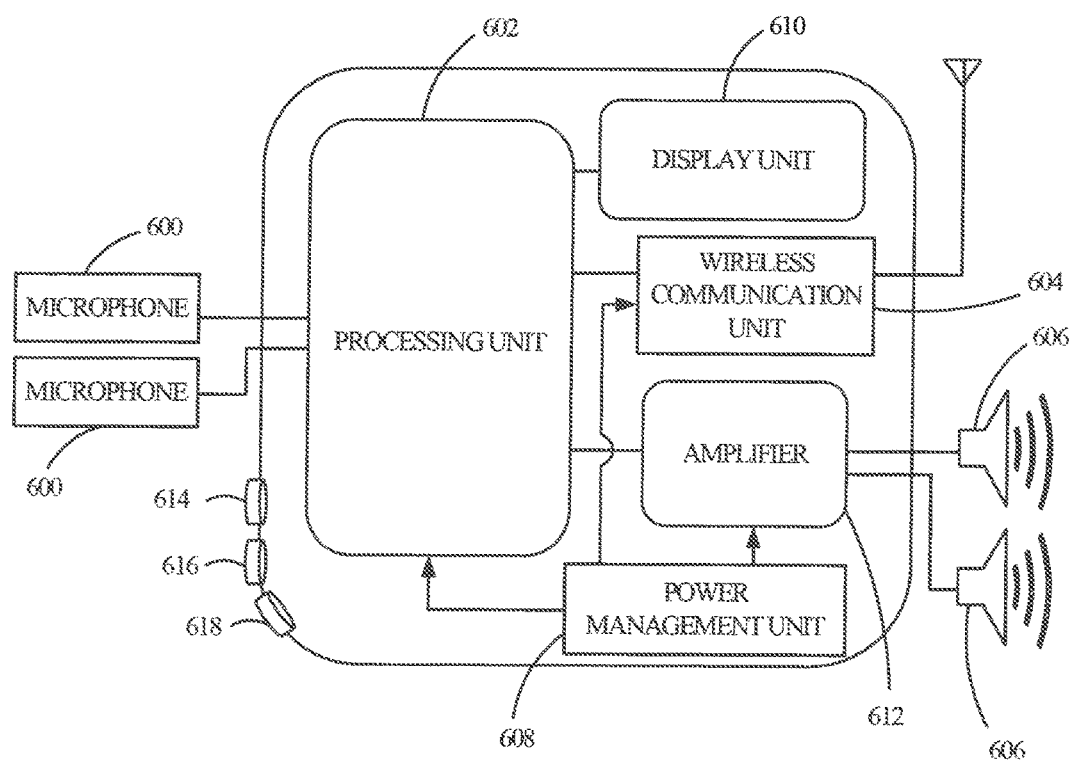
FIG. 5 is a voice receiving unit in accordance with a first embodiment of the present invention.

Please refer to FIG. 5. FIG. 5 is a voice receiving unit 60 in accordance with a first embodiment of the present invention. The voice receiving unit 60 is utilized for the voice control type bath system as shown in FIG. 1.

The voice receiving unit 60 includes at least one microphone 600, a processing unit 602, a wireless communication unit 604, at least one speaker 606, a power management unit 608, and at least one display unit 610.

The at least one microphone 600 is utilized for receiving the above-mentioned at least one voice signal. The processing unit 602 is electrically connected to the at least one microphone 600 and generates at least one controlling information corresponding to the at least one voice signal. The wireless communication unit 604 is utilized for converting the at least one controlling information into at least one wireless signal and transmitting the at least one wireless signal to the voice control type bath system. The at least one speaker 606 is electrically connected to the processing unit 602 and utilized for generating at least one audio signal according to the at least one controlling information of the processing unit 602. In one preferred embodiment, the voice receiving unit 60 further includes an amplifier 612. The amplifier 612 is electrically connected between the processing unit 602 and the at least one speaker 606. The amplifier 612 is utilized for amplifying the at least one controlling information and transmitting the amplified controlling information to the at least one speaker 606. The power management unit 608 is utilized for providing power for the processing unit 602, the wireless communication unit 604, and the amplifier 612. The at least one display unit 610 is electrically connected to the processing unit 602 and utilized for performing visual display according to the at least one controlling information of the processing unit 602 and/or quantity of electricity of the voice receiving unit 60. The at least one display unit 610, for example, may be a liquid crystal display (LCD) or a light emitting diode (LED) array.

Furthermore, the voice receiving unit 60 further includes a phone button 614, a massage bath equipment control button 616, and a music playing button 618. The phone button 616 is utilized for controlling a mobile terminal (e.g., the mobile terminal 34 in FIG. 2) to answer or dial a phone call. The massage bath equipment control button 616 is utilized for controlling corresponding actuations of a massage bath equipment (e.g., the massage bath equipment 50 in FIG. 1). The music playing button 618 is utilized for playing music stored in a mobile terminal (e.g., the mobile terminal 34 in FIG. 2).

Figure 6:
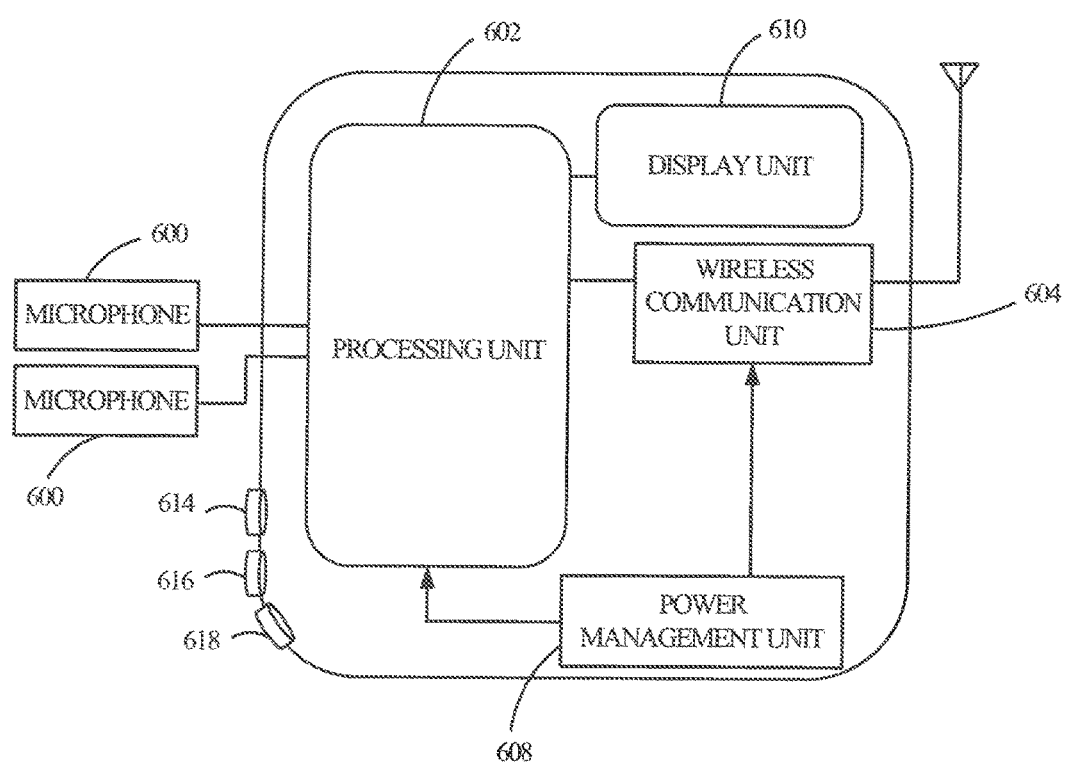
FIG. 6 is a voice receiving unit in accordance with a second embodiment of the present invention.

Please refer to FIG. 6. FIG. 6 is a voice receiving unit 62 in accordance with a second embodiment of the present invention.

A difference between the present embodiment and the embodiment in FIG. 5 is that the voice receiving unit 62 in the present embodiment does not include the amplifier 612 and the at least one speaker 606 in FIG. 5.

Figure 7:
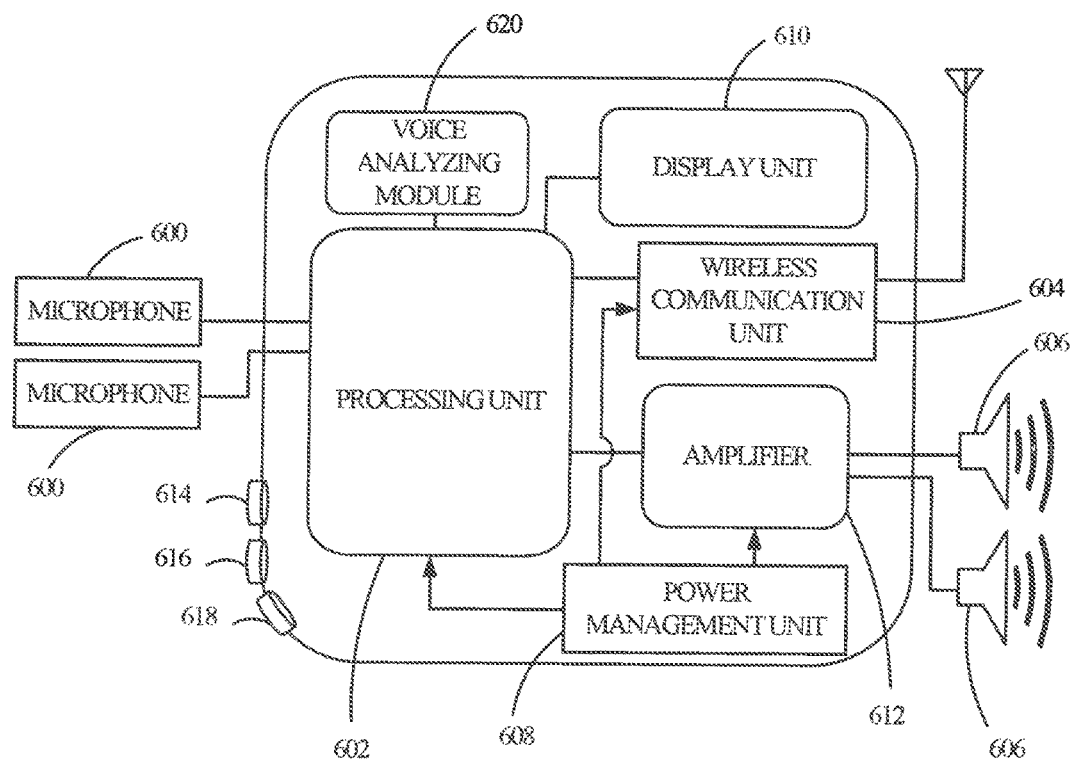
FIG. 7 is a voice receiving unit in accordance with a third embodiment of the present invention.

Please refer to FIG. 7. FIG. 7 is a voice receiving unit 64 in accordance with a third embodiment of the present invention.

A difference between the present embodiment and the embodiment in FIG. 5 is that the voice receiving unit 64 in the present embodiment further includes a voice analyzing module 620. The voice analyzing module 620 can be referred to corresponding descriptions of the voice analyzing module 30 in FIG. 2 and the voice analyzing module 48 in FIG. 3, and thus is omitted herein.

Figure 8:
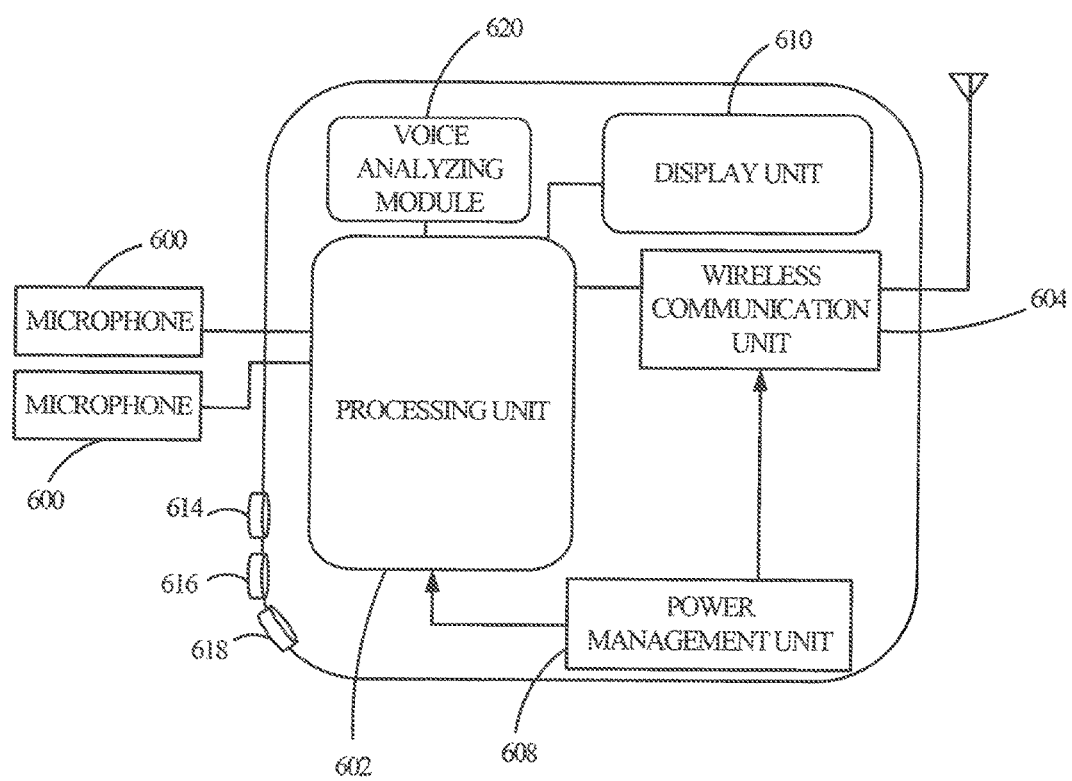
FIG. 8 is a voice receiving unit in accordance with a fourth embodiment of the present invention.

Please refer to FIG. 8. FIG. 8 is a voice receiving unit 66 in accordance with a fourth embodiment of the present invention.

A difference between the present embodiment and the embodiment in FIG. 7 is that the voice receiving unit 66 in the present embodiment does not include the amplifier 612 and the at least one speaker 606 in FIG. 7.

Figure 9:
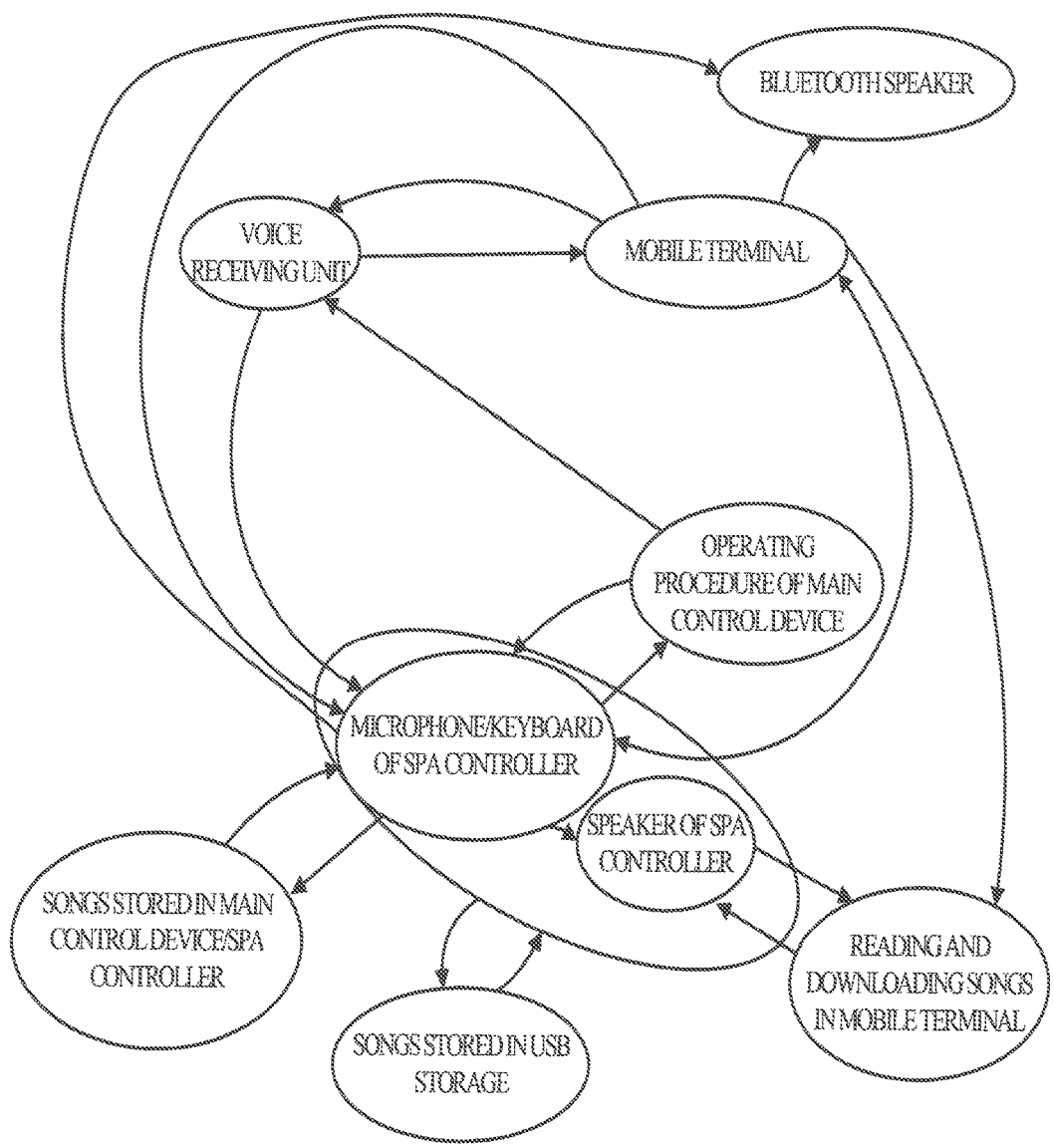
FIG. 9 is a flowchart of controlling the massage bath equipment to play music and answer/dial a phone call by using a voice signal in accordance with an embodiment of the present invention.

Please refer to FIG. 9. FIG. 9 is a flowchart of controlling the massage bath equipment to play music and answer/dial a phone call by using a voice signal in accordance with an embodiment of the present invention. A spa controller in FIG. 9 can be the main control device 18 or the control unit 180 in FIGS. 1-4. Furthermore, "SPA" in the figures of the present invention represents the massage bath equipment 50 in FIGS. 1-4. "USB" in the figures of the present invention represents a universal serial bus (USB) storage device. "BT" in the figures of the present invention represents BLUETOOTH.

Figure 10:
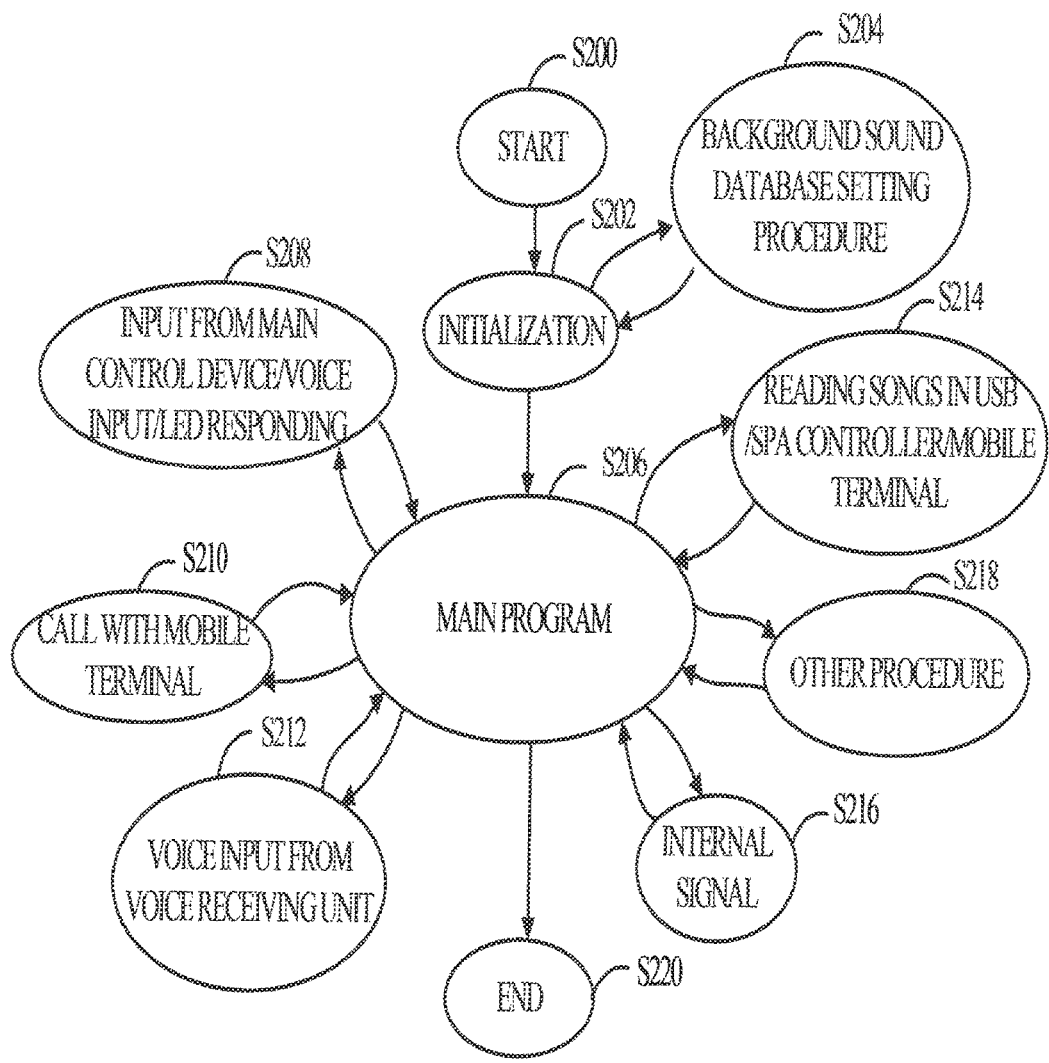
FIG. 10 is a flowchart of a main program and other programs of the voice control type bath system in accordance with an embodiment of the present invention.

Please refer to FIG. 10. FIG. 10 is a flowchart of a main program and other programs of the voice control type bath system in accordance with an embodiment of the present invention.

In step S200, the flowchart starts.

In step S202, the main control device executes an initialization program.

In step S204, a background sound database procedure is executed.

In step S206, the main control device executes the main program.

After the main control device executes the main program, other programs executed by the main control device include the following steps.

In step S208, the main control device executes an input command from the main control device and/or a voice and responds.

In step S210, a call with a mobile terminal is performed.

In step S212, the main control device receives at least one voice signal via the voice receiving unit.

In step S214, the main control device reads at least one song from a universal serial bus (USB) port, a memory in the main control device, or the mobile terminal.

In step S216, the main control device receives at least one internal signal (e.g., an attached device).

In step S218, the main control device executes any other procedure.

In step S220, the flowchart ends.

Figure 11:
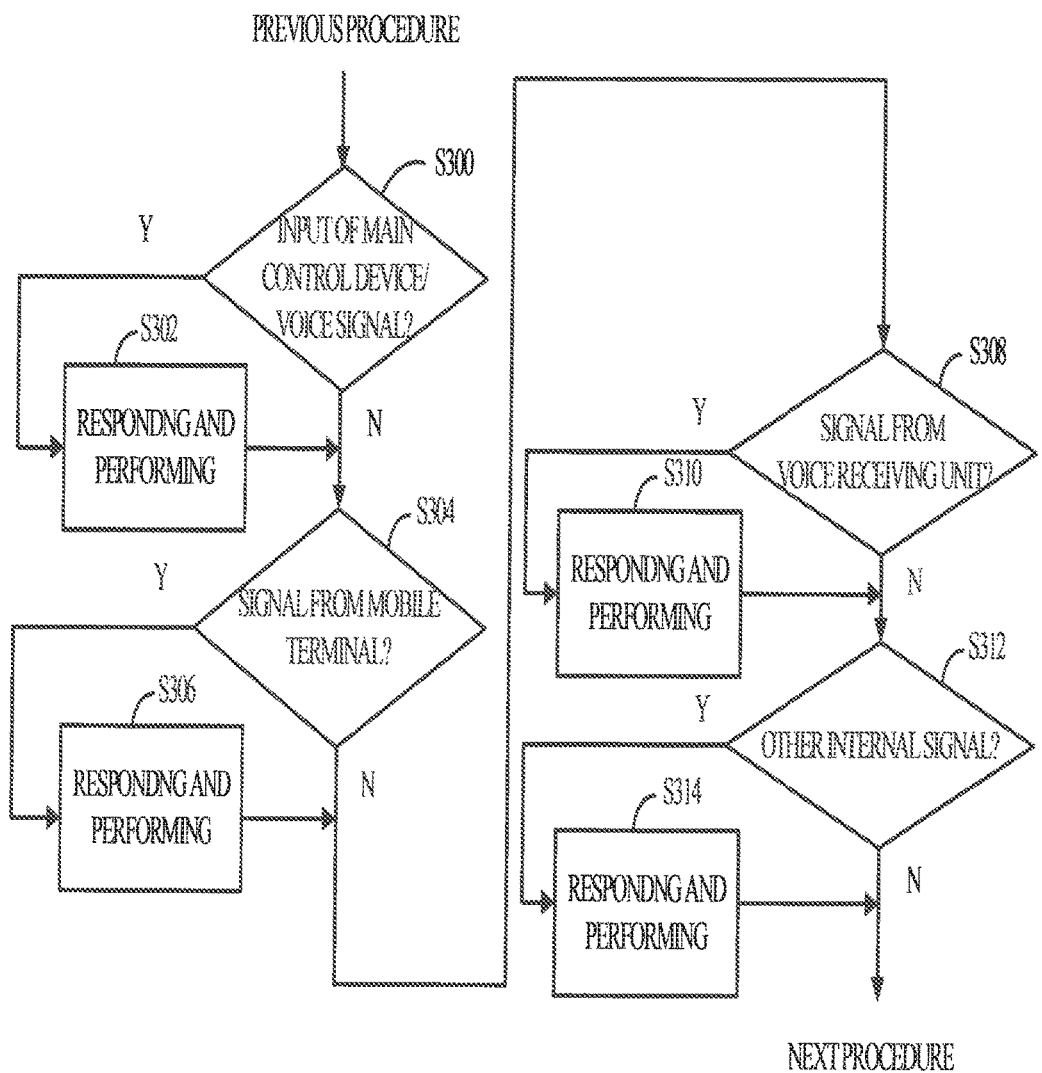
FIG. 11 is a flowchart of the main program in accordance with an embodiment of the present invention.

Please refer to FIG. 11. FIG. 11 is a flowchart of the main program in accordance with an embodiment of the present invention.

In step S300, it is determined whether there is an input of the main control device or an input of a voice signal. If yes, step S302 is performed. If no, step S304 is performed.

In step S302, a command corresponding to the input of the main control device or the input of the voice signal is responded and performed.

In step S304, it is determined whether there is a signal from a mobile terminal. If yes, step S306 is performed. If no, step S308 is performed.

In step S306, a command corresponding to the signal from the mobile terminal is responded and performed.

In step S308, it is determined whether the voice receiving unit receives at least one voice signal. If yes, step S310 is performed. If no, step S312 is performed.

In step S310, a command corresponding to the at least one voice signal is responded and performed.

In step S312, it is determined whether there is any other internal signal (e.g., an attached device). If yes, step S314 is performed. If no, a next procedure is executed.

In step S314, a command corresponding to the other internal signal is responded and performed.

Figure 12:
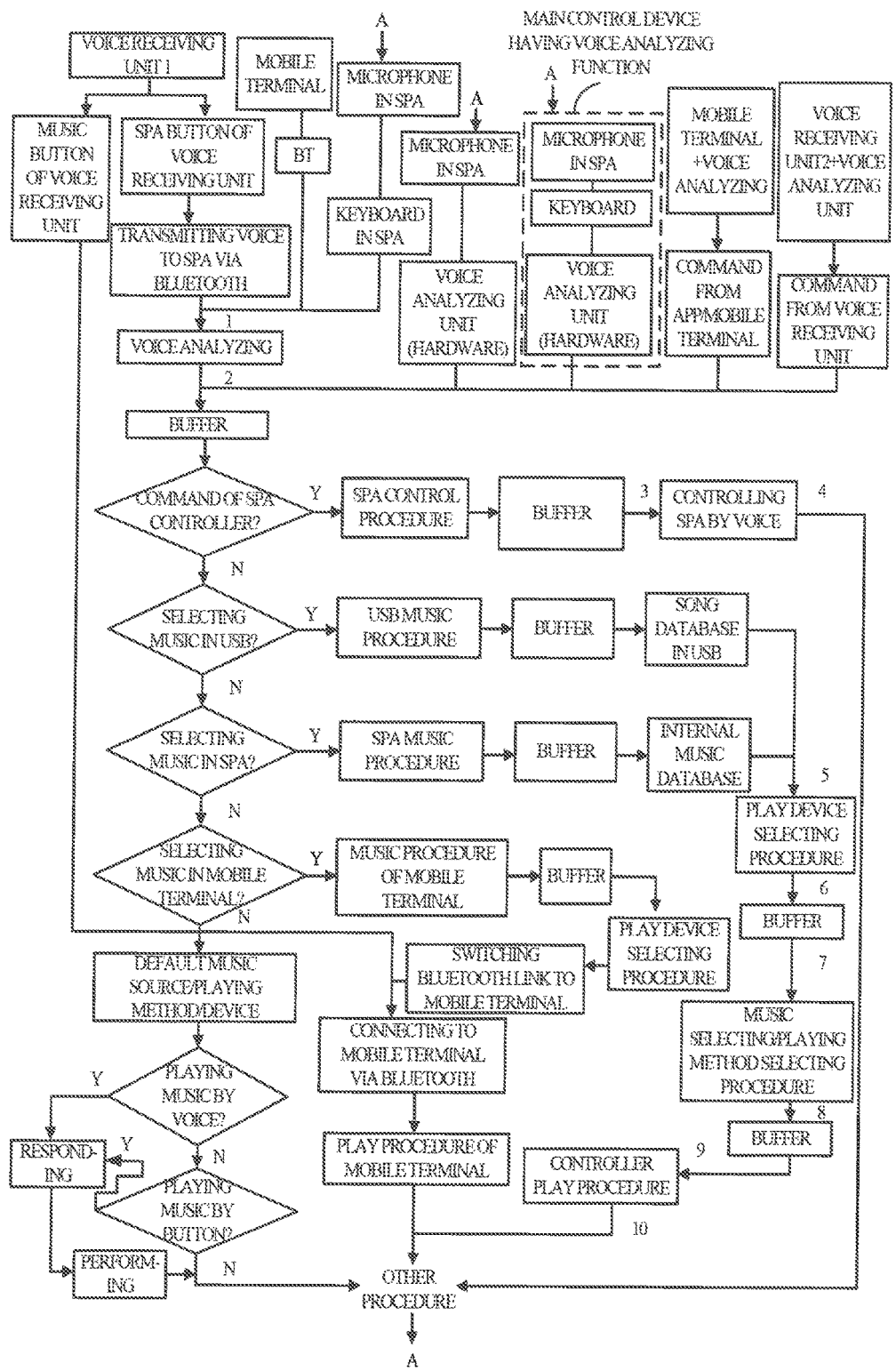
FIG. 12 is a flowchart of a voice control method of the voice control type bath system in accordance with an embodiment of the present invention.

Please refer to FIG. 12. FIG. 12 is a flowchart of a voice control method of the voice control type bath system in accordance with an embodiment of the present invention.

The present invention includes eight control methods. Processes of the eight control methods will be described in detail as follows.

First Method

A procedure of playing music is initiated by using the music playing button of the voice receiving unit (as shown in FIG. 1 or FIG. 2). Then, the voice receiving unit is linked to the mobile terminal via wireless communication (e.g., BLUETOOTH), and the mobile terminal initiates a playing procedure.

Second Method

A massage bath equipment control button of the voice receiving unit (as shown in FIG. 1 or FIG. 2) is pressed. At least one voice signal is transmitted to the main control device via wireless communication. The at least one voice signal is analyzed to generate at least one controlling command. Control of the massage bath equipment or control of music is performed according to the at least one controlling command. The control of music includes reading at least one song from a universal serial bus port, a memory in the main control device, or the mobile terminal.

Third Method

The mobile terminal receives at least one voice signal. The at least one voice signal is transmitted to the main control device via wireless communication. The voice signal is analyzed to generate at least one controlling command. Control of the massage bath equipment or control of music is performed according to the at least one controlling command. The control of music includes reading at least one song from a universal serial bus port, a memory in the main control device, or the mobile terminal.

Fourth Method

A microphone which is built in the main control device receives at least one voice signal. The at least one voice signal is transmitted to the main control device. The at least one voice signal is analyzed to generate at least one controlling command. Control of the massage bath equipment or control of music is performed according to the at least one controlling command. The control of music includes reading at least one song from a universal serial bus port, a memory in the main control device, or the mobile terminal.

Fifth Method

A microphone which is built in the main control device receives at least one voice signal. The voice analyzing unit (hardware) independent of the main control device analyzes the at least one voice signal to generate at least one controlling command. Control of the massage bath equipment or control of music is performed according to the at least one controlling command. The control of music includes reading at least one song from a universal serial bus port, a memory in the main control device, or the mobile terminal.

Sixth Method

A microphone which is built in the main control device receives at least one voice signal. The voice analyzing unit (hardware) disposed in the main control device analyzes the voice signal to generate at least one controlling command. Control of the massage bath equipment or control of music is performed according to the at least one controlling command. The control of music includes reading at least one song from a universal serial bus port, a memory in the main control device, or the mobile terminal.

Seventh Method

The mobile terminal receives at least one voice signal and analyzes the voice signal to generate at least one controlling command. Control of the massage bath equipment or control of music is performed according to the at least one controlling command. The control of music includes reading at least one song from a universal serial bus port, a memory in the main control device, or the mobile terminal.

Eighth Method

The voice receiving unit (as shown in FIG. 7 or FIG. 8) receives at least one voice signal. The voice analyzing module disposed in the voice receiving unit analyzes the at least one voice signal to generate at least one controlling command. Control of the massage bath equipment or control of music is performed according to the at least one controlling command. The control of music includes reading at least one song from a universal serial bus port, a memory in the main control device, or the mobile terminal.

It is noted that the playing procedure in the above-mentioned first method is directly initiated by the control button of the voice receiving unit, and the corresponding controls in the second method to the eighth method are performed by the at least one voice signal.

Figure 13:
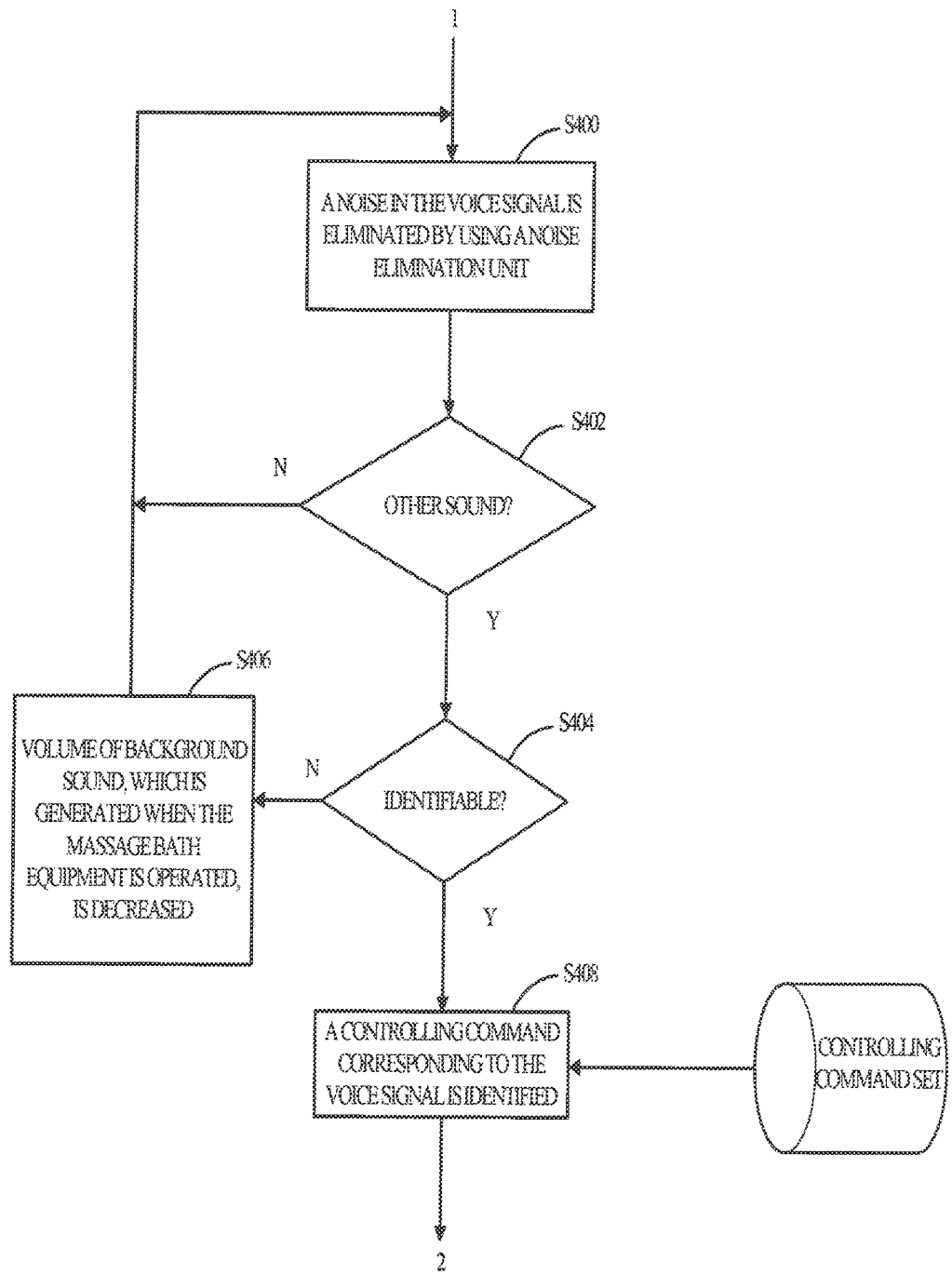
FIG. 13 is a flowchart of analyzing a voice signal in accordance with an embodiment of the present invention.

Please refer to FIG. 13. FIG. 13 is a flowchart of analyzing a voice signal in accordance with an embodiment of the present invention.

In step S400, a noise in the voice signal is eliminated by using a noise elimination unit.

In step S402, it is determined whether any other sound. If yes, step S404 is performed. If no, step S400 is performed.

In step S404, it is determined whether the voice signal is identifiable. If yes, step S408 is performed. If no, step S406 is performed.

In step S406, volume of background sound, which is generated when the massage bath equipment is operated, is decreased. Then, step S400 is performed.

In step S408, a controlling command corresponding to the voice signal is identified according to a controlling command set.

Figure 14:
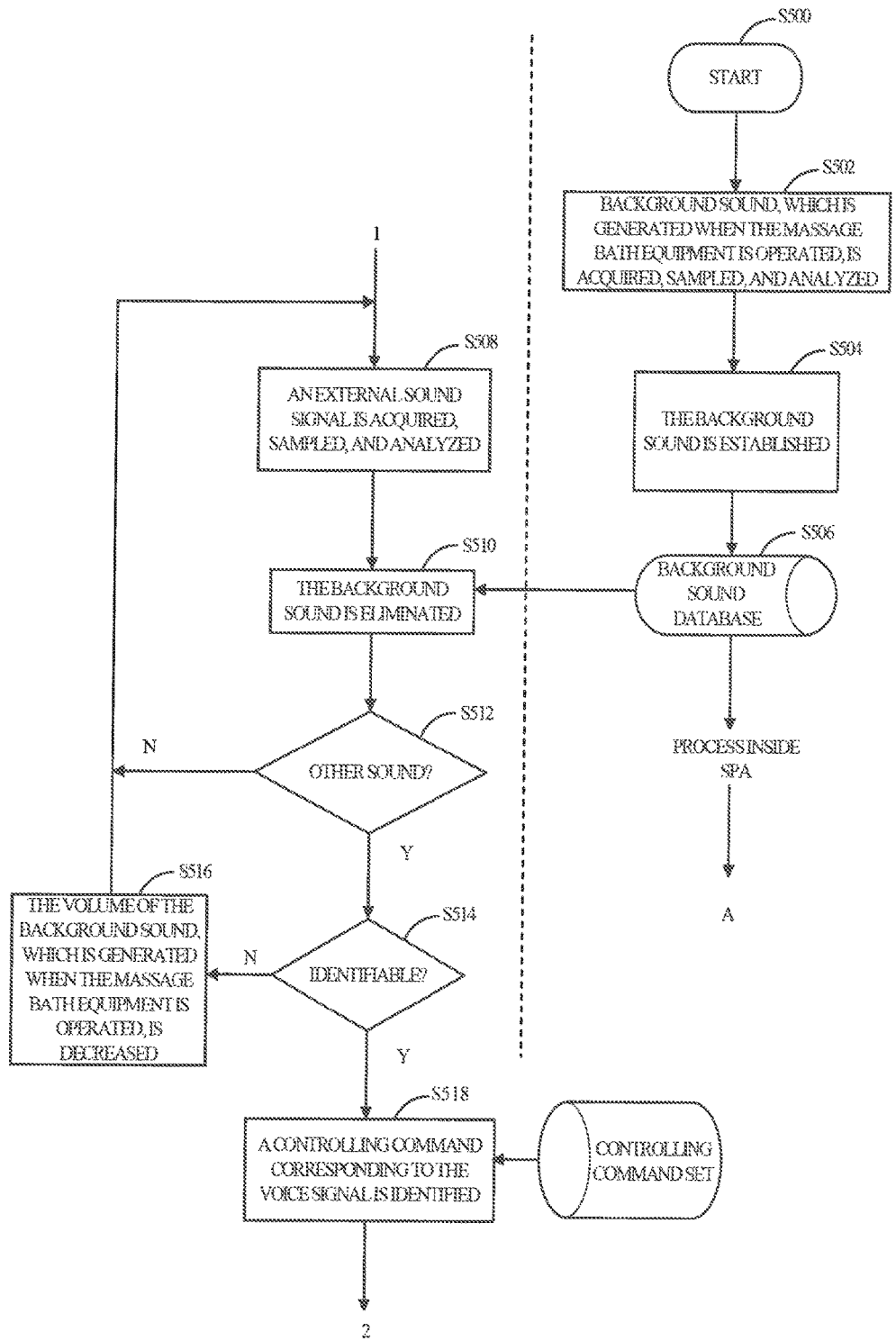
FIG. 14 is a flowchart of establishing a background sound database and analyzing a voice signal in accordance with an embodiment of the present invention.

Please refer to FIG. 14. FIG. 14 is a flowchart of establishing a background sound database and analyzing a voice signal in accordance with an embodiment of the present invention.

In step S500, the flowchart starts.

In step S502, background sound, which is generated when the massage bath equipment is operated, is acquired, sampled, and analyzed.

In step S504, the background sound is established.

In step S506, a background sound database is established.

The voice signal is analyzed from step S508 to step S518.

In step S508, an external sound signal is acquired, sampled, and analyzed.

In step S510, the background sound is eliminated.

Step S512 to step S518 may be referred to corresponding descriptions of step S402 to step S408 in FIG. 13 and are not repeated herein.

Figure 15:
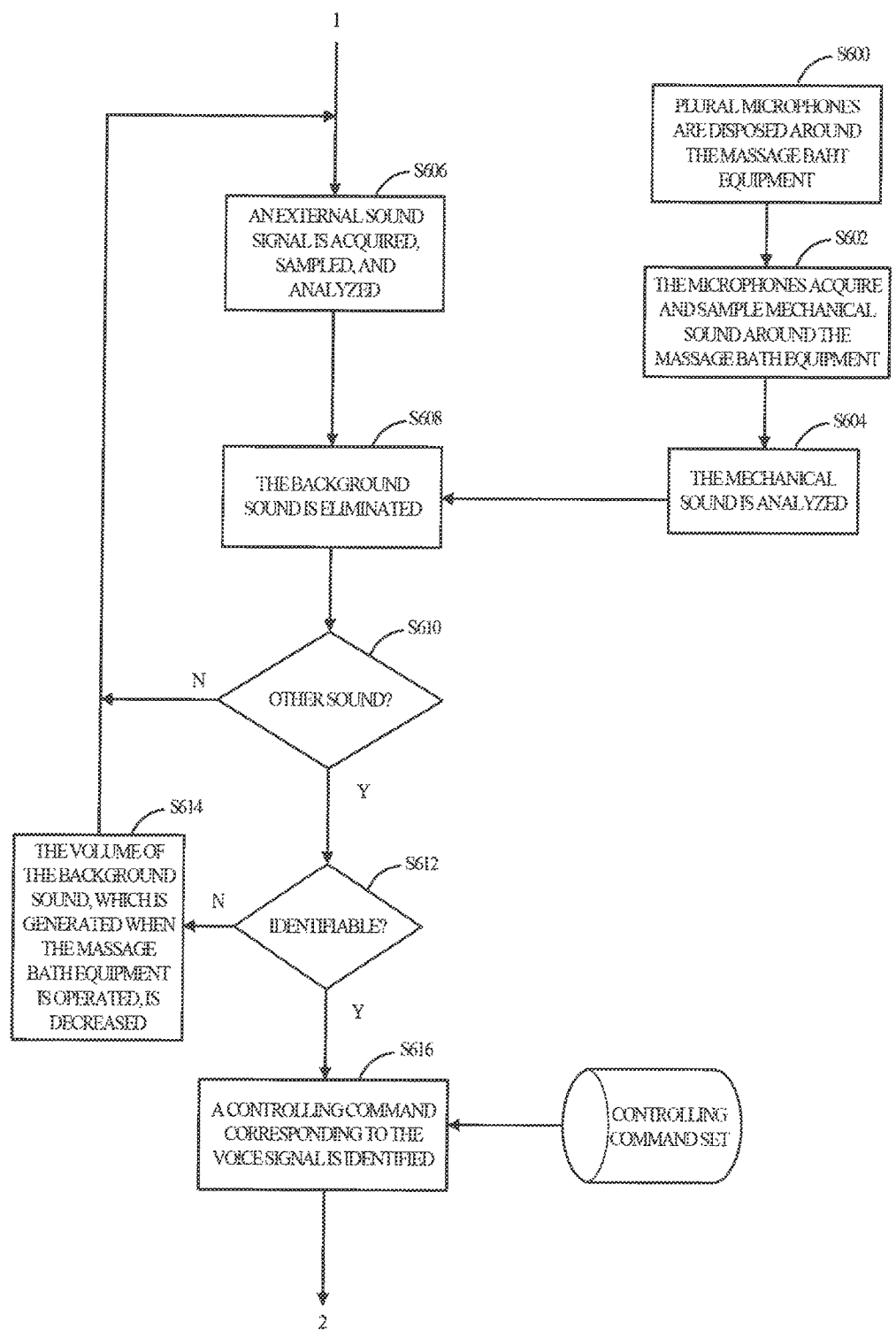
FIG. 15 is a flowchart of analyzing a voice signal in real-time in accordance with an embodiment of the present invention.

Please refer to FIG. 15. FIG. 15 is a flowchart of analyzing a voice signal in real-time in accordance with an embodiment of the present invention.

In step S600, plural microphones are disposed around the massage bath equipment.

In step S602, the microphones acquire and sample mechanical sound around the massage bath equipment.

In step S604, the mechanical sound is analyzed.

In step S606, external sound is acquired, sampled, and analyzed.

In step S608, the background sound is eliminated.

Step S610 to step S616 may be referred to corresponding descriptions of step S402 to step S408 in FIG. 13 and are not repeated herein.

Figure 16:
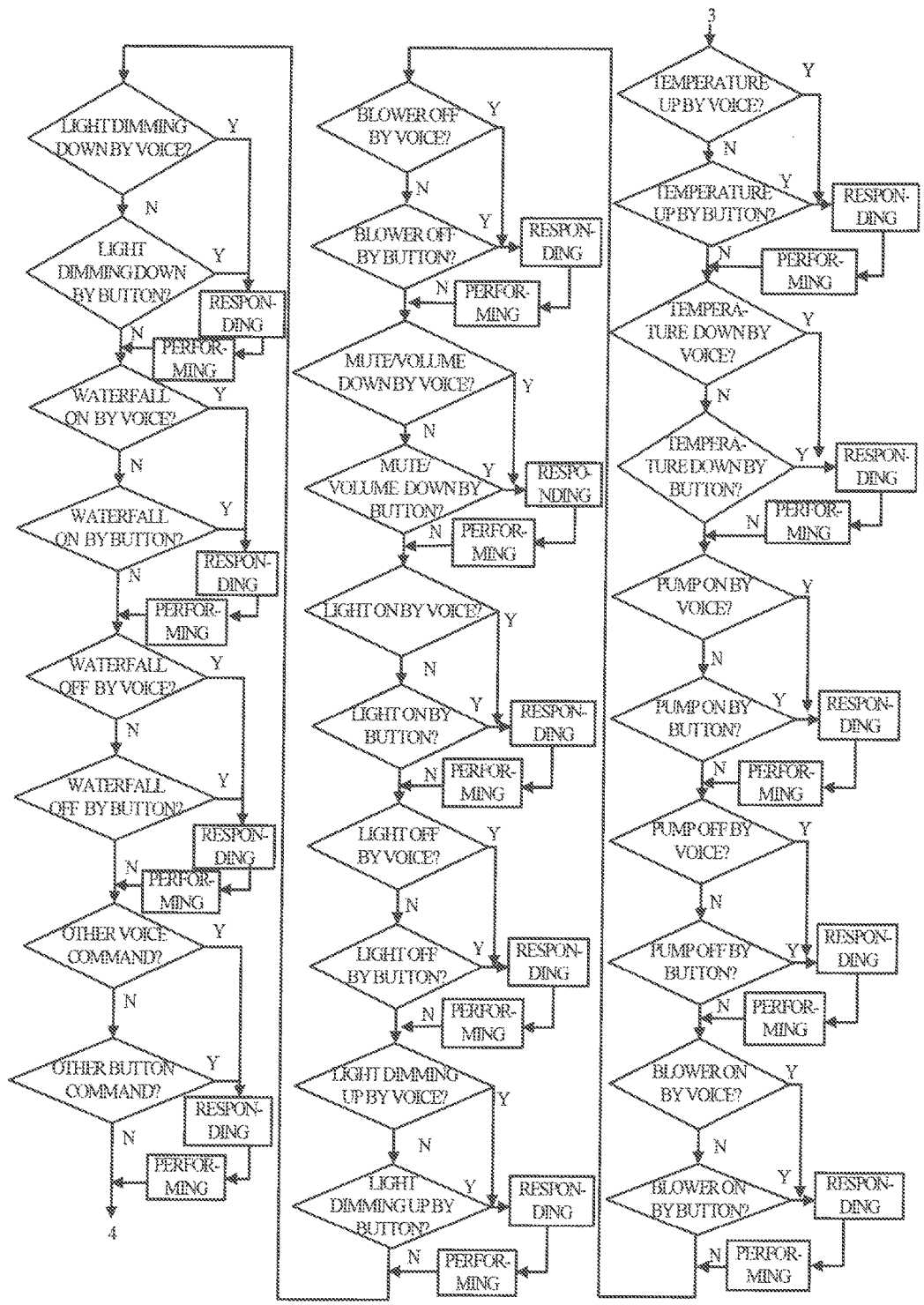
FIG. 16 is a flowchart of controlling various attached devices with a voice signal or a control button in accordance with an embodiment of the present invention.

Please refer to FIG. 16. FIG. 16 is a flowchart of controlling various attached devices with a voice signal or a control button in accordance with an embodiment of the present invention.

It can be appreciated from FIG. 16 that the attached devices can be controlled by the voice signal or the control button, and the attached devices respond after being controlled.

Figure 17:
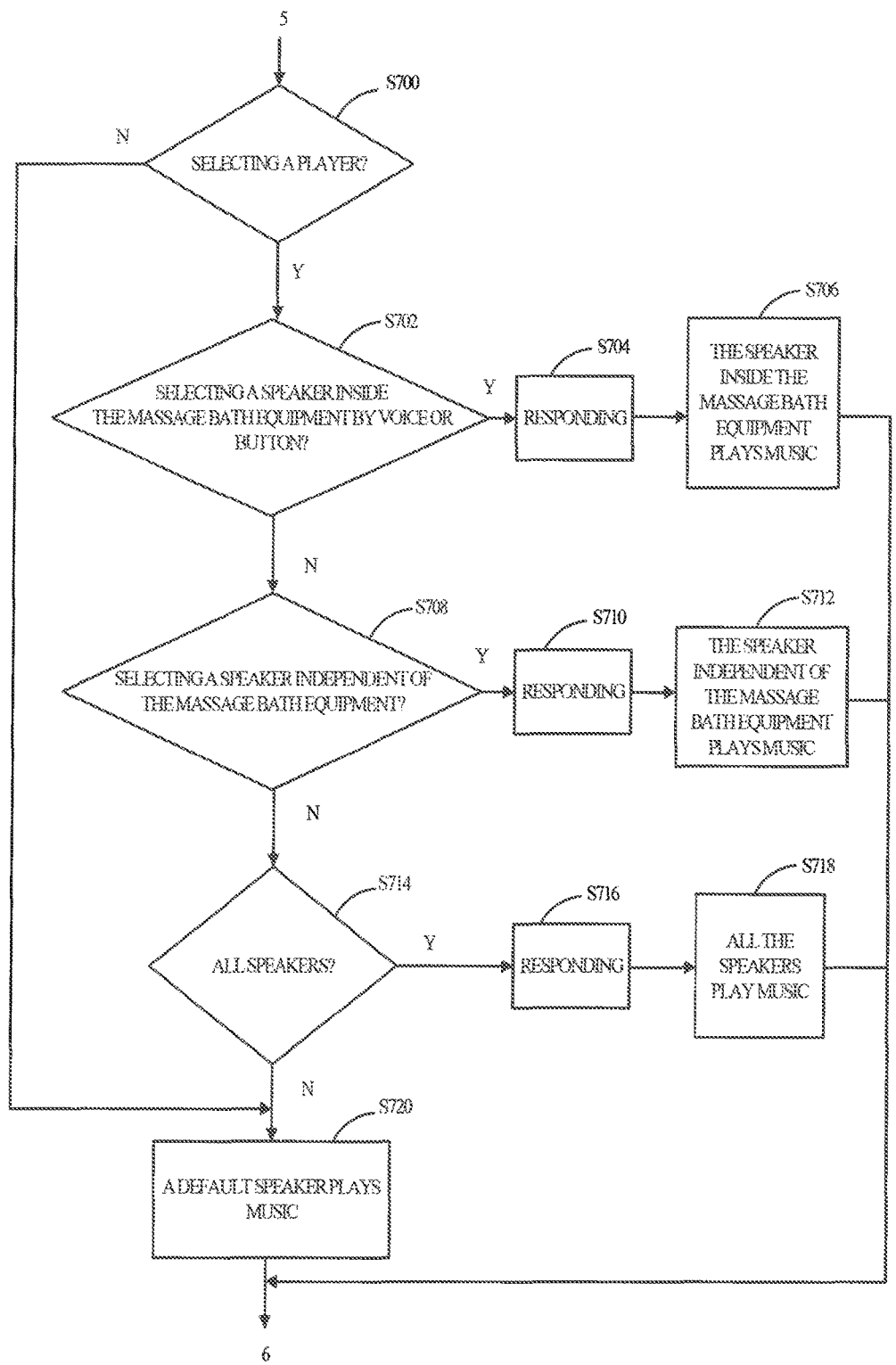
FIG. 17 is a flowchart of selecting a player in accordance with an embodiment of the present invention.

Please refer to FIG. 17. FIG. 17 is a flowchart of selecting a player in accordance with an embodiment of the present invention.

In step S700, it is determined whether the player is selected by a voice signal or a control button. If yes, step S702 is performed. If no, step S720 is performed.

In step S702, it is determined whether a speaker inside the massage bath equipment is selected. If yes, step S704 is performed. If no, step S708 is performed.

In step S704, the speaker responds.

In step S706, the speaker inside the massage bath equipment plays music and the flowchart ends.

In step S708, it is determined whether a speaker independent of the massage bath equipment is selected. If yes, step S710 is performed. If no, step S714 is performed.

In step S710, the speaker responds.

In step S712, the speaker independent of the massage bath equipment plays music and the flowchart ends.

In step S714, it is determined whether all speakers are selected. If yes, step S716 is performed. If no, step S720 is performed.

In step S716, all the speakers respond.

In step S718, all the speakers play music and the flowchart ends.

In step S720, a default speaker plays music and the flowchart ends.

Figure 18:
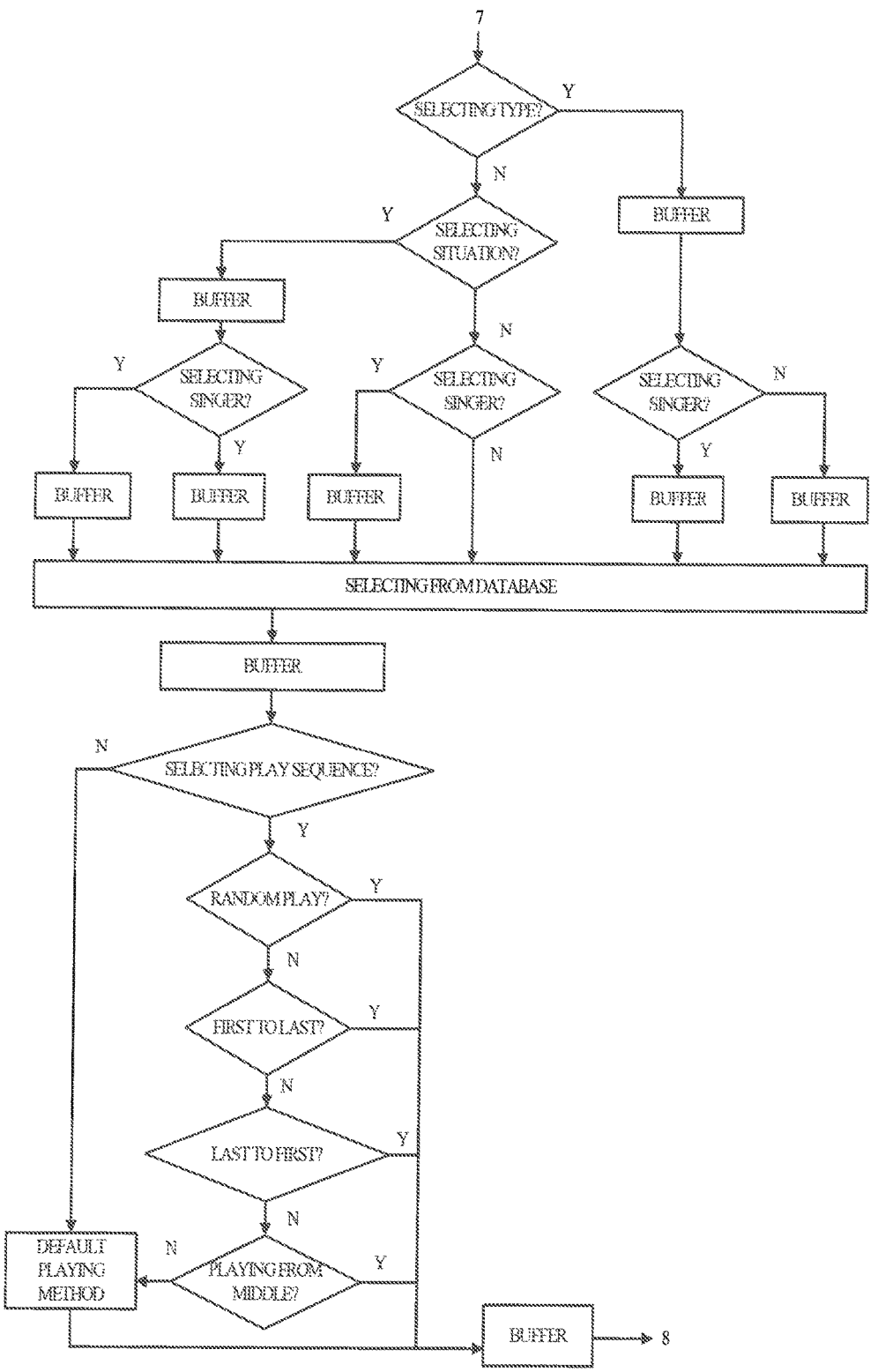
FIG. 18 is a flowchart of selecting at least one type, at least one singer, and a playing sequence in accordance with an embodiment of the present invention.

Please refer to FIG. 18. FIG. 18 is a flowchart of selecting at least one type, at least one singer, and a playing sequence in accordance with an embodiment of the present invention.

It can be appreciated from FIG. 18 that the at least one type and the at least one singer which meet conditions are selected from a database. Then, playing music is performed according to the selected playing sequence.

Figure 19:
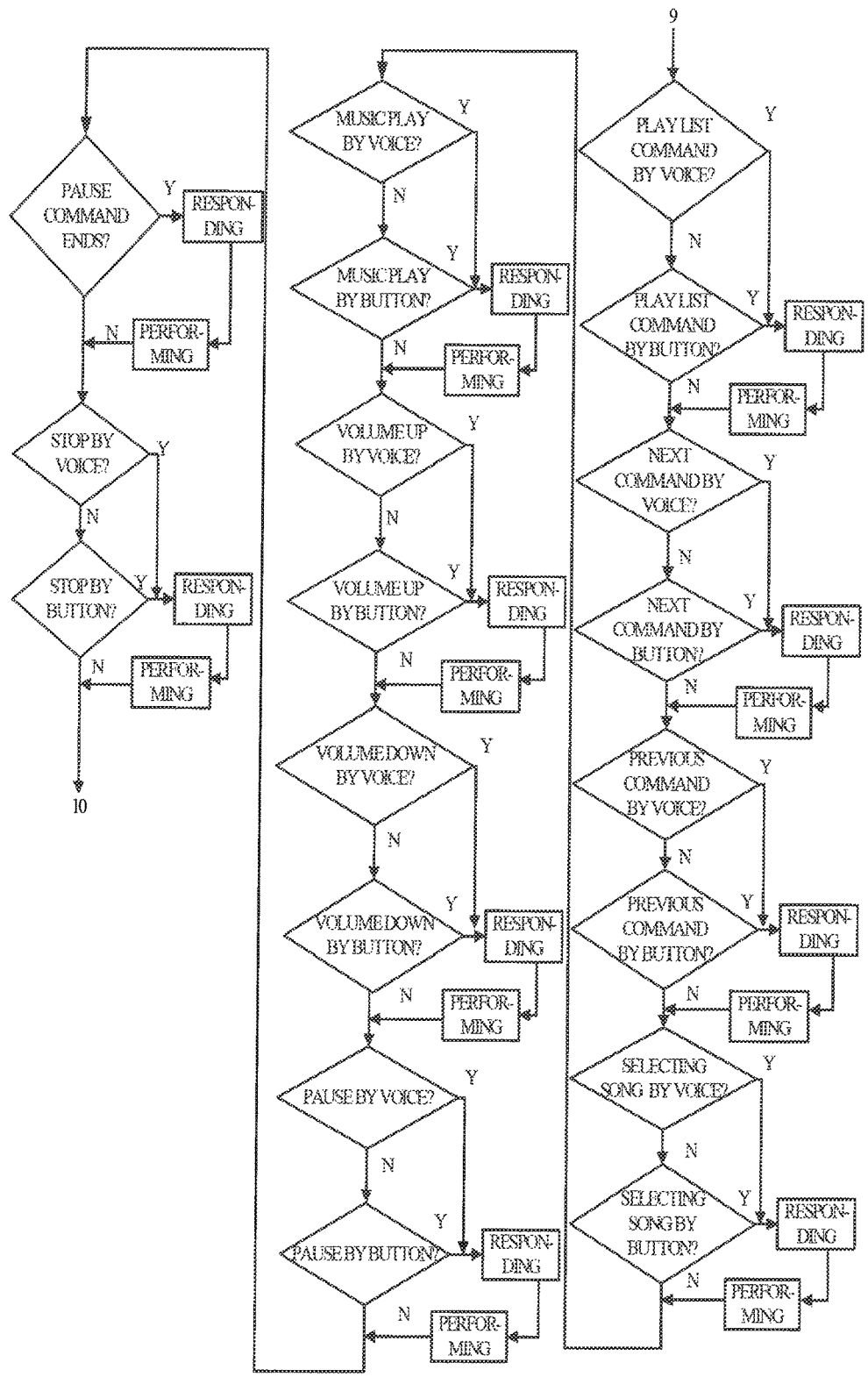
FIG. 19 is a flowchart of corresponding controls of playing songs in accordance with an embodiment of the present invention.

Please refer to FIG. 19. FIG. 19 is a flowchart of corresponding controls of playing songs in accordance with an embodiment of the present invention.

It can be appreciated from FIG. 19 that the corresponding controls of playing the songs can be controlled by a voice signal or a control button. Then, the corresponding controls respond after being performed.

It can be appreciated from FIG. 17 to FIG. 19 that the at least one attached device is a music player. The main control device controls the music player to perform at least one or a combination of the following functions: player selection, song type selection, singer selection, playing sequence selection, volume adjustment, song play/pause/stop, and next one song/previous one song according to the at least one controlling command.

Figure 20:
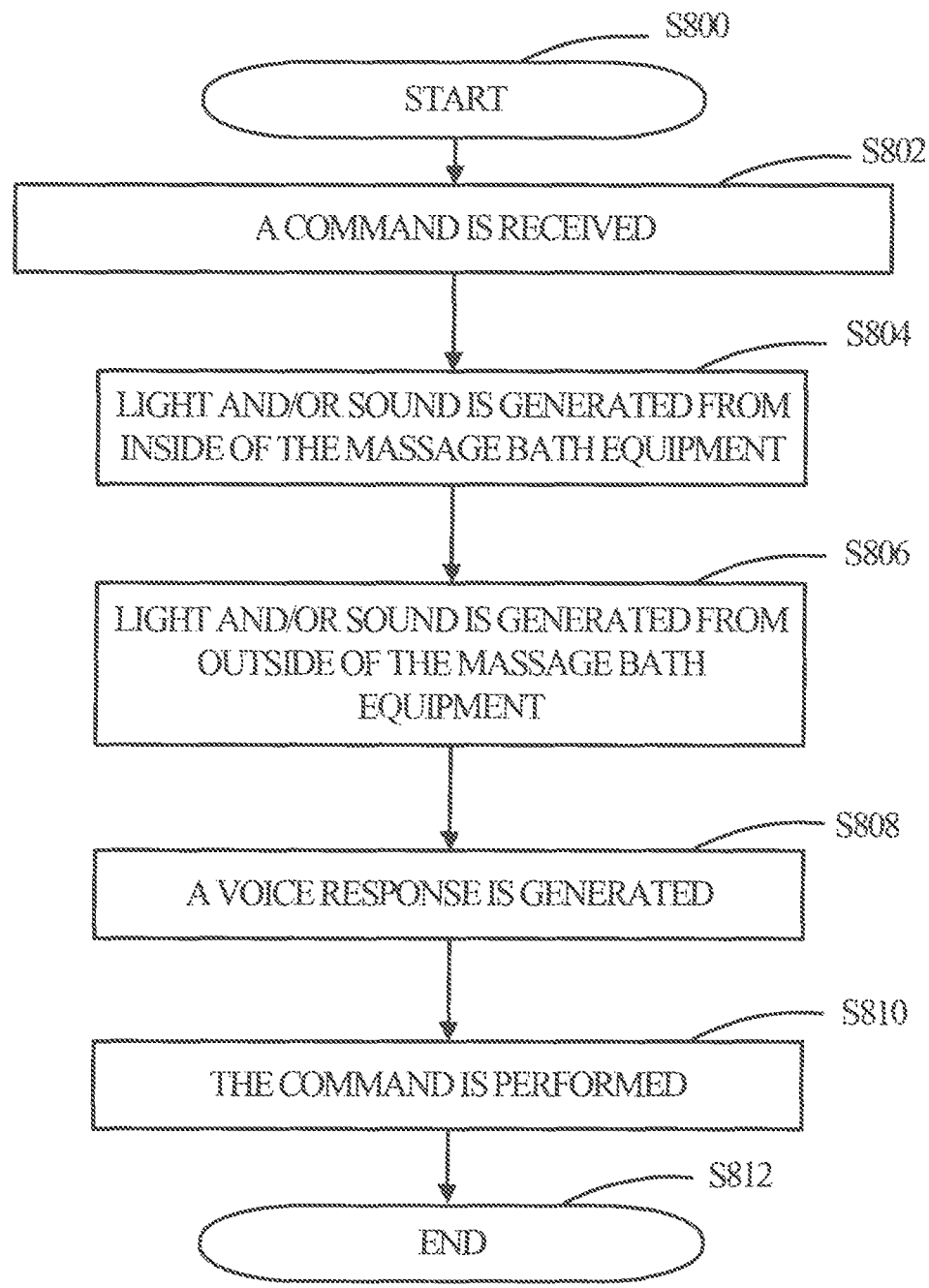
FIG. 20 is a flowchart of performing a command and responding in accordance with an embodiment of the present invention.

Please refer to FIG. 20. FIG. 20 is a flowchart of performing a command and responding in accordance with an embodiment of the present invention.

In step S800, the flowchart starts.

In step S802, a command is received. The command can be generated by a voice signal or a control button.

In step S804, light and/or sound is generated from inside of the massage bath equipment.

In step S806, light and/or sound is generated from outside of the massage bath equipment.

In step S808, a voice response is generated.

In step S810, the command is performed.

In step S812, the flowchart ends.

Figure 21:
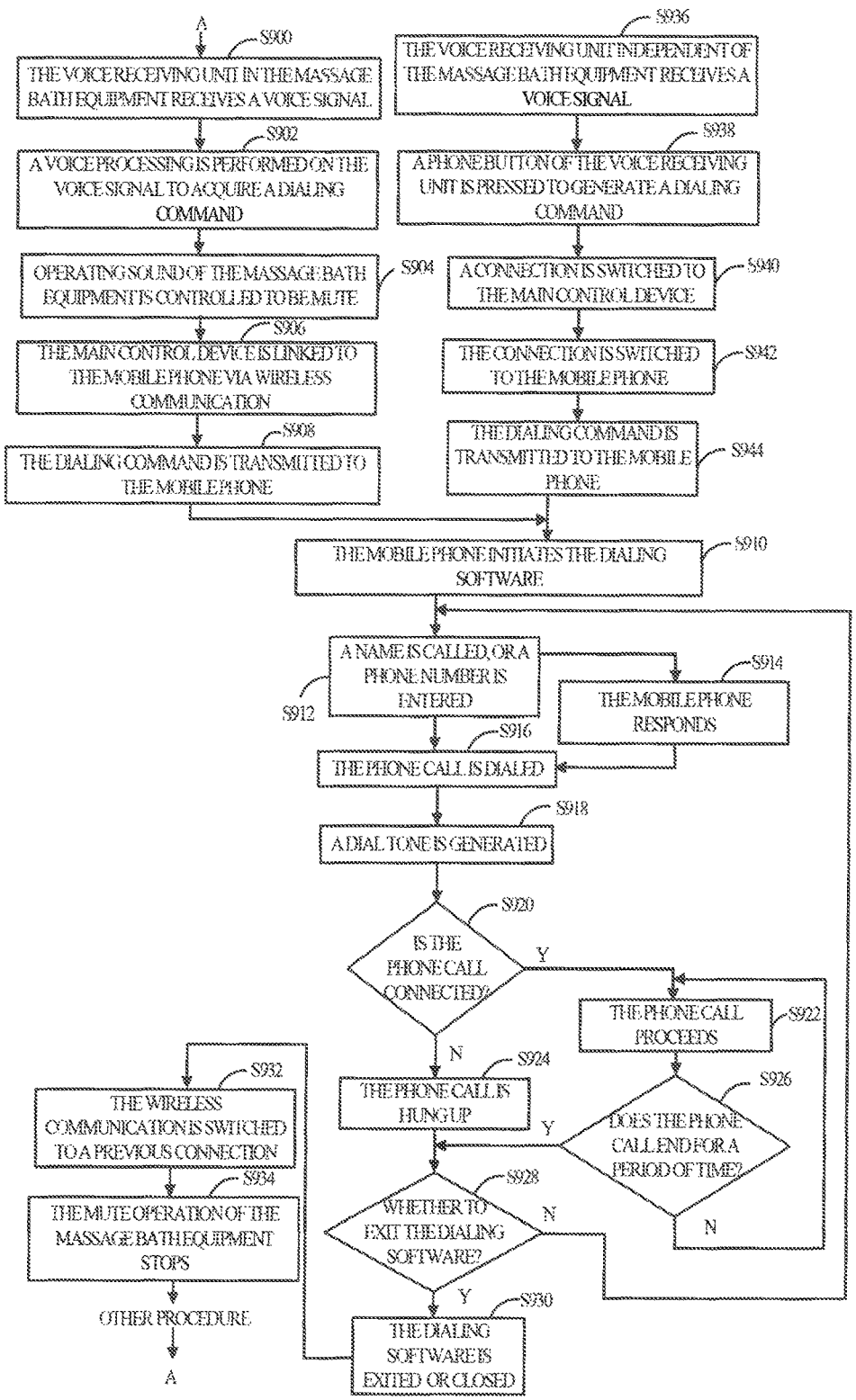
FIG. 21 is a flowchart of dialing a phone call by utilizing a dialing software installed in a mobile phone in accordance with an embodiment of the present invention.

Please refer to FIG. 21. FIG. 21 is a flowchart of dialing a phone call by utilizing a dialing software installed in a mobile phone in accordance with an embodiment of the present invention.

In the present embodiment, two methods for controlling the dialing software installed in a mobile phone to dial a phone call are provided.

First Method

In step S900, the voice receiving unit in the massage bath equipment receives a voice signal.

In step S902, a voice processing is performed on the voice signal to acquire a dialing command.

In step S904, operating sound of the massage bath equipment is controlled to be mute. For example, the volume of the operating sound of the massage bath equipment is decreased, or the massage bath equipment stops operating.

In step S906, the main control device is linked to the mobile phone via wireless communication.

In step S908, the dialing command is transmitted to the mobile phone.

In step S910, the mobile phone initiates the dialing software.

In step S912, a name is called, or a phone number is entered. Then, step S914 or step S916 is performed.

In step S914, the mobile phone responds.

In step S916, the phone call is dialed.

In step S918, a dial tone is generated.

In step S920, it is determined whether the phone call is connected. If yes, step S922 is performed. If no, step S924 is performed.

In step S922, the phone call proceeds, and step S926 is performed.

In step S924, the phone call is hung up, and step S928 is performed.

In step S926, it is determined whether the phone call ends for a period of time. If yes, step S928 is performed. If no, step S922 is performed.

In step S928, it is determined whether to exit the dialing software. If yes, step S930 is performed. If no, step S912 is performed.

In step S930, the dialing software is exited or closed.

In step S932, the wireless communication is switched to a previous connection.

In step S934, the mute operation of the massage bath equipment stops, and the operation of the massage bath equipment is restored.

Second Method

In step S936, the voice receiving unit independent of the massage bath equipment receives a voice signal.

In step S938, a phone button of the voice receiving unit is pressed to generate a dialing command.

In step S940, a connection is switched to the main control device.

In step S942, the connection is switched to the mobile phone.

In step S944, the dialing command is transmitted to the mobile phone.

Step S910 to step S934 may be referred to the above-mentioned descriptions and are not repeated herein.

Figure 22:
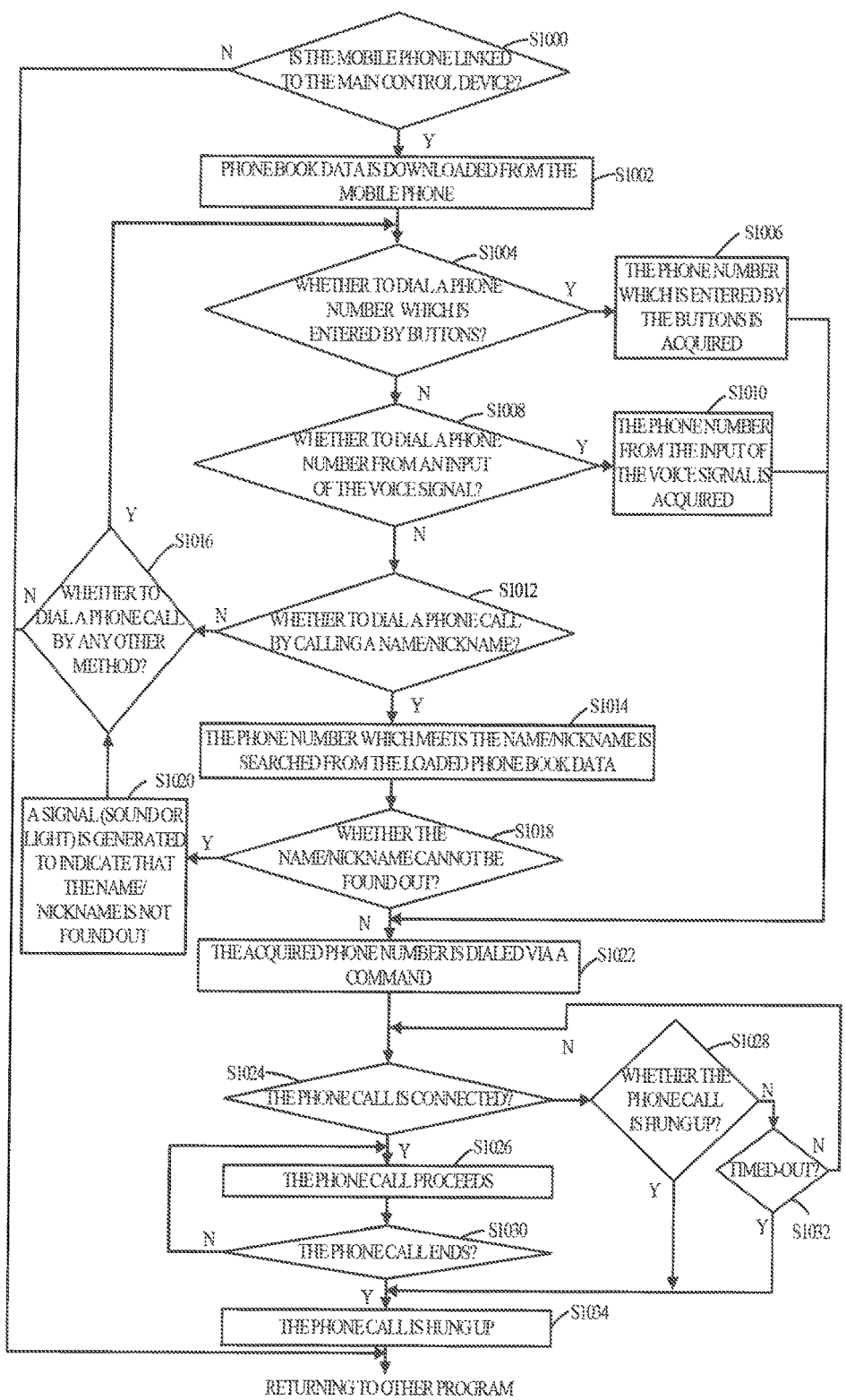
FIG. 22 is a flowchart of dialing a phone call by utilizing a voice signal in accordance with another embodiment of the present invention.

Please refer to FIG. 22. FIG. 22 is a flowchart of dialing a phone call by utilizing a voice signal in accordance with another embodiment of the present invention.

In step S1000, it is determined whether the mobile phone is linked to the main control device. If yes, step S1002 is performed. If no, the flowchart ends.

In step S1002, phone book data is downloaded from the mobile phone.

In step S1004, it is determined whether to dial a phone number which is entered by buttons. If yes, step S1006 is performed. If no, step S1008 is performed.

In step S1006, the phone number which is entered by the buttons is acquired, and step S1022 is performed.

In step S1008, it is determined whether to dial a phone number from an input of the voice signal. If yes, step S1010 is performed. If no, step S1012 is performed.

In step S1010, the phone number from the input of the voice signal is acquired, and step S1022 is performed.

In step S1012, it is determined whether to dial a phone call by calling a name/nickname. If yes, step S1014 is performed. If no, step S1016 is performed.

In step S1014, the phone number which meets the name/nickname is searched from the loaded phone book data, and step S1018 is performed.

In step S1016, it is determined whether to dial a phone call by any other method. If yes, step S1004 is performed. If no, the flowchart ends.

In step S1018, it is determined whether the name/nickname cannot be found out. If yes, step S1020 is performed. If no, step S1022 is performed.

In step S1020, a signal (sound or light) is generated to indicate that the name/nickname is not found out.

In step S1022, the acquired phone number is dialed via a command.

In step S1024, it is determined whether the phone call is connected. If yes, step S1026 is performed. If no, step S1028 is performed.

In step S1026, the phone call proceeds, and step S1030 is performed.

In step S1028, it is determined whether the phone call is hung up. If yes, step S1030 is performed. If no, step S1032 is performed.

In step S1030, it is determined whether the phone call ends. If yes, step S1034 is performed. If no, step S1026 is performed.

In step S1032, it is determined whether the phone call is timed-out. If yes, step S1034 is performed. If no, step S1024 is performed.

In step S1034, the phone call is hung up.

Figure 23:
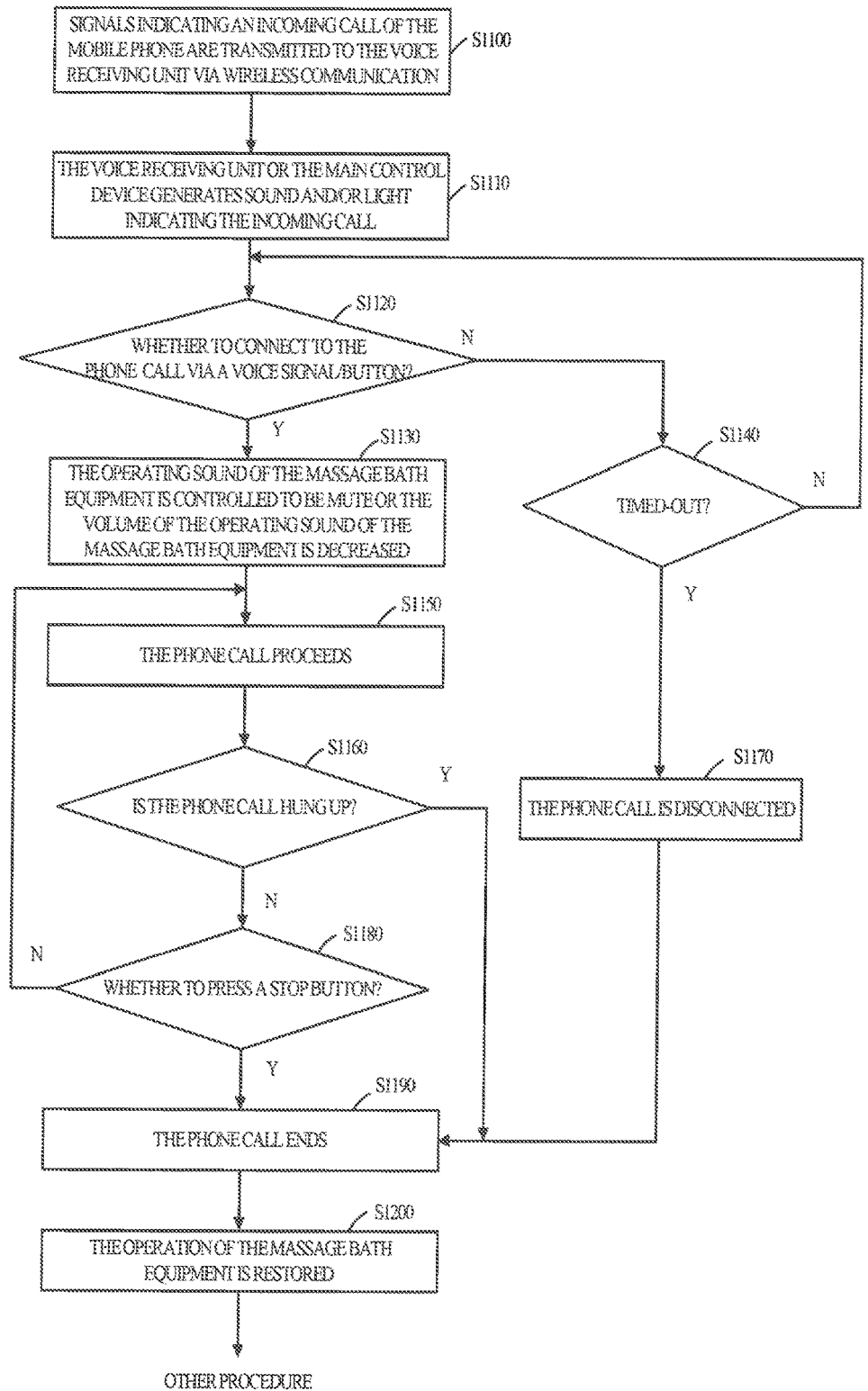
FIG. 23 is a flowchart of controlling a mobile phone to answer a phone call in accordance with an embodiment of the present invention.

Please refer to FIG. 23. FIG. 23 is a flowchart of controlling a mobile phone to answer a phone call in accordance with an embodiment of the present invention.

In step S1100, signals indicating an incoming call of the mobile phone are transmitted to the voice receiving unit via wireless communication.

In step S1110, the voice receiving unit or the main control device generates sound and/or light indicating the incoming call.

In step S1120, it is determined whether to connect to the phone call via a voice signal/button. If yes, step S1130 is performed. If no, step S140 is performed.

In step S1130, the operating sound of the massage bath equipment is controlled to be mute or the volume of the operating sound of the massage bath equipment is decreased. Step S1150 is performed.

In step S1140, it is determined whether the phone call is timed-out. If yes, step S1170 is performed. If no, step S1120 is performed.

In step S1150, the phone call proceeds.

In step S1160, it is determined whether the phone call is hung up. If yes, step S1190 is performed. If no, step S1180 is performed.

In step S1170, the phone call is disconnected, and step S1190 is performed.

In step S1180, it is determined whether to press a stop button. If yes, step S190 is performed. If no, step S1150 is performed.

In step S1190, the phone call ends.

In step S1200, the operation of the massage bath equipment is restored.

Figure 24:
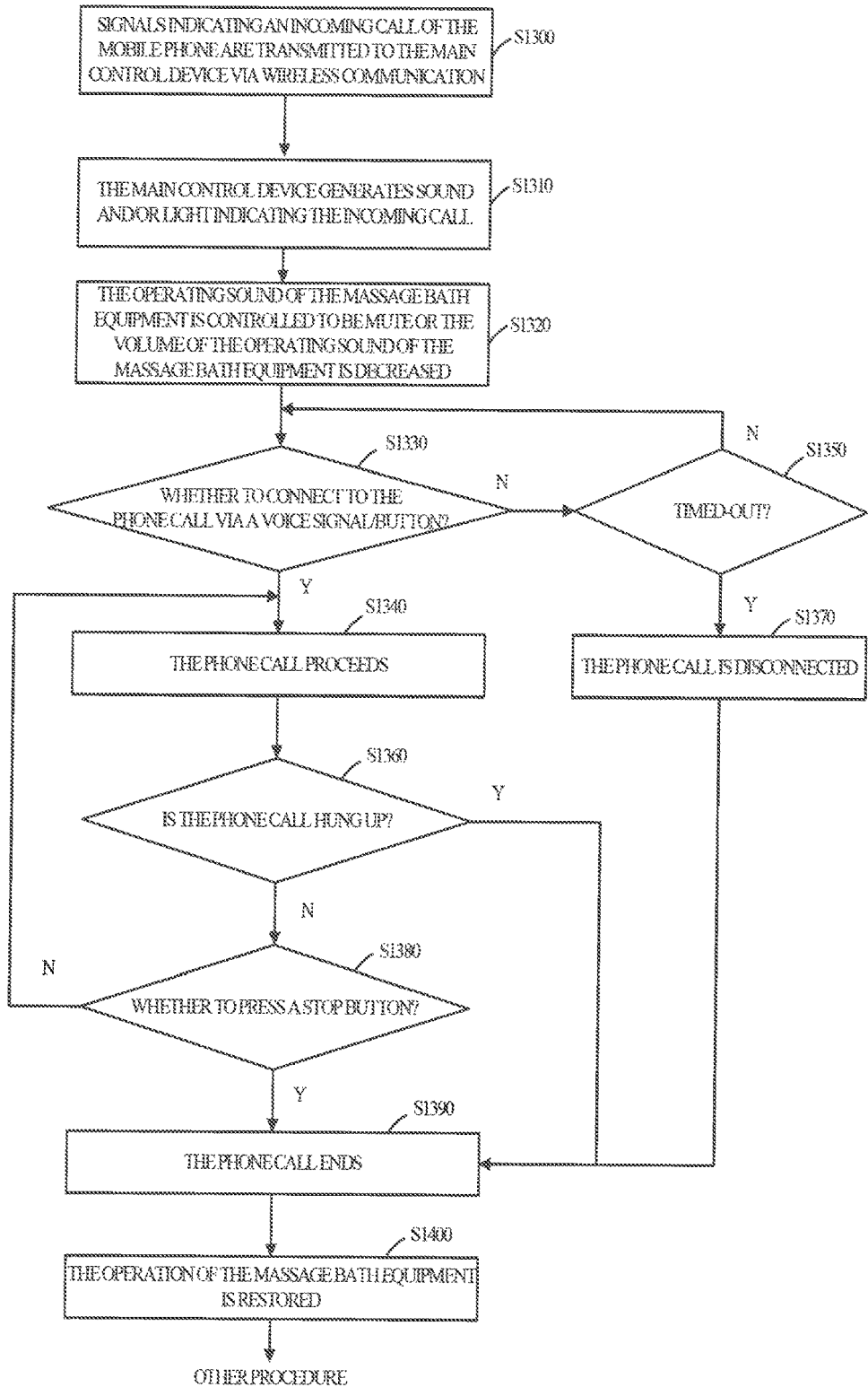
FIG. 24 is a flowchart of controlling a mobile phone to answer a phone call in accordance with another embodiment of the present invention.

Please refer to FIG. 24. FIG. 24 is a flowchart of controlling a mobile phone to answer a phone call in accordance with another embodiment of the present invention.

In step S1300, signals indicating an incoming call of the mobile phone are transmitted to the main control device via wireless communication.

In step S1310, the main control device generates sound and/or light indicating the incoming call.

In step S1320, the operating sound of the massage bath equipment is controlled to be mute or the volume of the operating sound of the massage bath equipment is decreased. Step S1330 is performed.

In step S1330, it is determined whether to connect to the phone call via a voice signal/button. If yes, step S1340 is performed. If no, step S1350 is performed.

In step S1340, the phone call proceeds.

In step S1350, it is determined whether the phone call is timed-out. If yes, step S1370 is performed. If no, step S1330 is performed.

In step S1360, it is determined whether the phone call is hung up. If yes, step S1390 is performed. If no, step S1380 is performed.

In step S1370, the phone call is disconnected, and step S1390 is performed.

In step S1380, it is determined whether to press a stop button. If yes, step S1390 is performed. If no, step S1340 is performed.

In step S1390, the phone call ends.

In step S1400, the operation of the massage bath equipment is restored.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A voice control type bath system, utilized for a massage bath equipment, the voice control type bath system comprising:
   at least one attached device utilized for actuating the massage bath equipment;
   a voice receiving unit utilized for receiving at least one voice signal;
   a voice analyzing module coupled to the voice receiving unit and utilized for analyzing the at least one voice signal to generate at least one controlling command; and
   a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module,
   the voice control type bath system further comprising a first wireless communication module, wherein the voice analyzing module is disposed in the main control device, and the voice analyzing module receives the at least one voice signal via the first wireless communication module.

2. The voice control type bath system of claim 1, wherein the main control device comprises a control unit utilized for controlling the at least one attached device to actuate the massage bath equipment according to the at least one controlling command.

3. The voice control type bath system of claim 1, further comprising a second wireless communication module, wherein the main control device is wirelessly connected to a remote server via the second wireless communication module.

4. The voice control type bath system of claim 1, further comprising a second wireless communication module, wherein the main control device is wirelessly connected to a mobile terminal via the second wireless communication module.

5. The voice control type bath system of claim 4, wherein the mobile terminal is utilized for wirelessly connecting to the voice receiving unit, and the mobile terminal answers or dials a phone call according to the at least one controlling command generated by the voice analyzing module or the at least one voice signal received by the voice receiving unit.

6. The voice control type bath system of claim 5, wherein when the mobile terminal answers or dials the phone call, volume of operating sound of the massage bath equipment is decreased or the massage bath equipment stops operating, when the phone call ends, the massage bath equipment is restored to a previous operation.

7. The voice control type bath system of claim 4, wherein the mobile terminal is utilized for wirelessly connecting to the voice receiving unit and generating the at least one voice signal.

8. The voice control type bath system of claim 1, wherein the voice receiving unit has a floatable structure, a movable structure, or a fixable structure, and the voice receiving unit is disposed adjacent to the massage bath equipment.

9. The voice control type bath system of claim 1, wherein the voice analyzing module eliminates a noise in the at least one voice signal before the voice analyzing module analyzes the at least one voice signal.

10. The voice control type bath system of claim 1, further comprising at least one application, wherein the main control device executes the at least one application according to the at least one controlling command.

11. A voice control type bath system, utilized for a massage bath equipment, the voice control type bath system comprising:
   at least one attached device utilized for actuating the massage bath equipment;
   a voice receiving unit utilized for receiving at least one voice signal;
   a voice analyzing module coupled to the voice receiving unit and utilized for analyzing the at least one voice signal to generate at least one controlling command; and
   a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module,
   wherein the at least one attached device is a music player, and the main control device controls the music player to perform at least one or a combination of player selection, song type selection, singer selection, playing sequence selection, volume adjustment, song play/pause/stop, and next one song/previous one song according to the at least one controlling command.

12. A voice control type bath system, utilized for a massage bath equipment, the voice control type bath system comprising:
- at least one attached device utilized for actuating the massage bath equipment;
- a voice receiving unit utilized for receiving at least one voice signal;
- a voice analyzing module coupled to the voice receiving unit and utilized for analyzing the at least one voice signal to generate at least one controlling command; and
- a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module,
- the voice control type bath system further comprising a first wireless communication module, wherein the voice analyzing module is disposed in the voice receiving unit, and the main control device receives the at least one controlling command via the first wireless communication module; and
- a second wireless communication module, wherein the main control device is wirelessly connected to a remote server via the second wireless communication module.

13. A voice control type bath system, utilized for a massage bath equipment, the voice control type bath system comprising:
- at least one attached device utilized for actuating the massage bath equipment;
- a voice receiving unit utilized for receiving at least one voice signal;
- a voice analyzing module coupled to the voice receiving unit and utilized for analyzing the at least one voice signal to generate at least one controlling command; and
- a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module,
- the voice control type bath system further comprising:
- a first wireless communication module, wherein the voice analyzing module is disposed in the voice receiving unit, and the main control device receives the at least one controlling command via the first wireless communication module; and
- a second wireless communication module, wherein the main control device is wirelessly connected to a mobile terminal via the second wireless communication module.

14. The voice control type bath system of claim 13, wherein the mobile terminal is utilized for wirelessly connecting to the voice receiving unit, and the mobile terminal answers or dials a phone call according to the at least one controlling command generated by the voice analyzing module or the at least one voice signal received by the voice receiving unit.

15. The voice control type bath system of claim 14, wherein when the mobile terminal answers or dials the phone call, volume of operating sound of the massage bath equipment is decreased or the massage bath equipment stops operating,
when the phone call ends, the massage bath equipment is restored to a previous operation.

16. The voice control type bath system of claim 13, wherein the mobile terminal is utilized for wirelessly connecting to the voice receiving unit and generating the at least one voice signal.

17. A voice control type bath system, utilized for a massage bath equipment, the voice control type bath system comprising:
- at least one attached device utilized for actuating the massage bath equipment;
- a voice receiving unit utilized for receiving at least one voice signal;
- a voice analyzing module coupled to the voice receiving unit and utilized for analyzing the at least one voice signal to generate at least one controlling command; and
- a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module,
- wherein the voice analyzing module is disposed in the voice receiving unit,
- wherein the voice receiving unit wirelessly connects to a mobile terminal.

18. The voice control type bath system of claim 17, wherein the mobile terminal answers or dials a phone call according to the at least one controlling command.

19. The voice control type bath system of claim 18, wherein when the mobile terminal answers or dials the phone call, volume of operating sound of the massage bath equipment is decreased or the massage bath equipment stops operating,
when the phone call ends, the massage bath equipment is restored to a previous operation.

20. The voice control type bath system of claim 17, wherein the mobile terminal plays music according to the at least one controlling command.

21. The voice control type bath system of claim 17, wherein the voice receiving unit has a floatable structure, a movable structure, or a fixable structure, and the voice receiving unit is disposed adjacent to the massage bath equipment.

22. A voice control type bath system, utilized for a massage bath equipment, the voice control type bath system comprising:
- at least one attached device utilized for actuating the massage bath equipment;
- a voice receiving unit utilized for receiving at least one voice signal;
- a voice analyzing module coupled to the voice receiving unit and utilized for analyzing the at least one voice signal to generate at least one controlling command; and
- a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module, the voice control type bath system further comprising:

a first wireless communication module; and a mobile terminal wirelessly connected to the main control device via the first wireless communication module and generating the at least one voice signal, wherein the voice receiving unit and the voice analyzing module are disposed in the main control device.

23. The voice control type bath system of claim 22, further comprising a second wireless communication module, wherein the main control device is wirelessly connected to a remote server via the second wireless communication module.

24. A voice control type bath system, utilized for a massage bath equipment, the voice control type bath system comprising:

at least one attached device utilized for actuating the massage bath equipment;

a voice receiving unit utilized for receiving at least one voice signal;

a voice analyzing module coupled to the voice receiving unit and utilized for analyzing the at least one voice signal to generate at least one controlling command; and a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module, wherein the voice receiving unit and the voice analyzing module are disposed in the main control device, the voice control type bath system further comprising a mobile terminal wirelessly connected to the main control device, wherein the mobile terminal answers or dials a phone call according to the at least one controlling command generated by the voice analyzing module or the at least one voice signal received by the voice receiving unit.

25. The voice control type bath system of claim 24, wherein when the mobile terminal answers or dials the phone call, volume of operating sound of the massage bath equipment is decreased or the massage bath equipment stops operating, when the phone call ends, the massage bath equipment is restored to a previous operation.

26. A voice control type bath system, utilized for a massage bath equipment, the voice control type bath system comprising:

at least one attached device utilized for actuating the massage bath equipment;

a voice receiving unit utilized for receiving at least one voice signal;

a voice analyzing module coupled to the voice receiving unit and utilized for analyzing the at least one voice signal to generate at least one controlling command; and a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module, the voice control type bath system further comprising a first wireless communication module, wherein the main control device receives the at least one voice signal via the first wireless communication module.

27. The voice control type bath system of claim 26, further comprising a second wireless communication module, wherein the main control device is wirelessly connected to a remote server via the second wireless communication module, the voice analyzing module is disposed in the remote server, the main control device transmits the at least one voice signal to the remote server via the second wireless communication module, and the remote server transmits the at least one controlling command to the main control device after the voice analyzing module generates the at least one controlling command.

28. A voice control type bath system, utilized for a massage bath equipment, the voice control type bath system comprising:

at least one attached device utilized for actuating the massage bath equipment;

a voice receiving unit utilized for receiving at least one voice signal;

a voice analyzing module coupled to the voice receiving unit and utilized for analyzing the at least one voice signal to generate at least one controlling command; and a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module, the voice control type bath system further comprising a second wireless communication module, wherein the main control device is wirelessly connected to a remote server via the second wireless communication module, the voice analyzing module is disposed in the remote server, the main control device transmits the at least one voice signal to the remote server via the second wireless communication module, and the remote server transmits the at least one controlling command to the main control device after the voice analyzing module generates the at least one controlling command, wherein the voice receiving unit is disposed in the main control device.

29. A voice control type bath system, utilized for a massage bath equipment, the voice control type bath system comprising:

at least one attached device utilized for actuating the massage bath equipment;

a voice receiving unit utilized for receiving at least one voice signal;

a voice analyzing module coupled to the voice receiving unit and utilized for analyzing the at least one voice signal to generate at least one controlling command; and a main control device coupled to the at least one attached device and utilized for controlling the at least one attached device to actuate the massage bath equipment according to the at least one controlling command of the voice analyzing module and/or for controlling an actuation of the at least one attached device according to the at least one controlling command of the voice analyzing module, wherein the voice receiving unit wirelessly connects to a remote server, the voice analyzing module is disposed in the remote server, the voice receiving unit transmits the at least one voice signal to the remote server, and the remote server transmits the at least one controlling command to the main control device after the voice analyzing module generates the at least one controlling command.

30. A voice receiving unit, utilized for a voice control type bath system, the voice receiving unit comprising:

at least one microphone utilized for receiving at least one voice signal;

a processing unit electrically connected to the at least one microphone and generating at least one controlling information corresponding to the at least one voice signal; and a wireless communication unit utilized for converting the at least one controlling information into at least one wireless signal and transmitting the at least one wireless signal to the voice control type bath system, the voice receiving unit further comprising:

a voice analyzing module electrically connected to the processing unit and utilized for analyzing the at least one voice signal to generate at least one controlling command, wherein the processing unit generates the at least one controlling information according to the at least one controlling command.

31. The voice receiving unit of claim 30, further comprising:

at least one speaker electrically connected to the processing unit and utilized for generating at least one audio signal according to the at least one controlling information of the processing unit.

32. The voice receiving unit of claim 30, further comprising:

at least one display unit electrically connected to the processing unit and utilized for performing visual display according to the at least one controlling information of the processing unit.

33. The voice receiving unit of claim 30, further comprising:

at least one speaker electrically connected to the processing unit and utilized for generating at least one audio signal according to the at least one controlling information of the processing unit.

34. The voice receiving unit of claim 30, further comprising:

a power management unit utilized for providing power for the processing unit; and at least one display unit electrically connected to the processing unit and utilized for displaying quantity of electricity of the voice receiving unit.

35. An operating method of a voice control type bath system, utilized for a massage bath equipment, the voice control type bath system comprising at least one attached device, a voice receiving unit, a voice analyzing module, and a main control device, the operating method of the voice control type bath system comprising:

receiving at least one voice signal by the voice receiving unit;

analyzing the at least one voice signal to generate at least one controlling command by the voice analyzing module; and controlling the at least one attached device to actuate the massage bath equipment according to the at least one controlling command of the voice analyzing module and/or controlling an actuation of the attached device according to the at least one controlling command of the voice analyzing module, wherein the voice control type bath system further comprises a first wireless communication module, the voice analyzing module is disposed in the main control device, and the voice analyzing module receives the at least one voice signal via the first wireless communication module.

36. The operating method of the voice control type bath system of claim 35, wherein the voice control type bath system further comprises a second wireless communication module, and the operating method of the voice control type bath system further comprises:

connecting the main control device to a remote server wirelessly via the second wireless communication module.

37. The operating method of the voice control type bath system of claim 35, wherein the voice control type bath system further comprises a second wireless communication module, and the operating method of the voice control type bath system further comprises:

connecting the main control device to a mobile terminal wirelessly via the second wireless communication module;

connecting the mobile terminal to the voice receiving unit wirelessly and generating the at least one voice signal by the mobile terminal; and answering or dialing, by the mobile terminal, a phone call according to the at least one controlling command generated by the voice analyzing module or the at least one voice signal received by the voice receiving unit.

38. The operating method of the voice control type bath system of claim 37, wherein when the mobile terminal answers or dials the phone call, volume of operating sound of the massage bath equipment is decreased or the massage bath equipment stops operating, when the phone call ends, the massage bath equipment is restored to a previous operation.

39. The operating method of the voice control type bath system of claim 35, wherein the voice control type bath system further comprises at least one application, and the operating method of the voice control type bath system further comprises:

executing the at least one application according to the at least one controlling command by the main control device.

40. An operating method of a voice control type bath system, utilized for a massage bath equipment, the voice control type bath system comprising at least one attached device, a voice receiving unit, a voice analyzing module, and a main control device, the operating method of the voice control type bath system comprising:

receiving at least one voice signal by the voice receiving unit;

analyzing the at least one voice signal to generate at least one controlling command by the voice analyzing module; and controlling the at least one attached device to actuate the massage bath equipment according to the at least one controlling command of the voice analyzing module and/or controlling an actuation of the attached device according to the at least one controlling command of the voice analyzing module, wherein the voice control type bath system further comprises a first wireless communication module, the voice analyzing module is disposed in the voice receiving unit, and the main control device receives the at least one voice signal via the first wireless communication module.

41. The operating method of the voice control type bath system of claim 40, wherein the voice control type bath system further comprises a second wireless communication module, and the operating method of the voice control type bath system further comprises:
    connecting the main control device to a mobile terminal wirelessly via the second wireless communication module;
    connecting the mobile terminal to the voice receiving unit wirelessly and generating the at least one voice signal by the mobile terminal; and
    answering or dialing, by the mobile terminal, a phone call according to the at least one controlling command generated by the voice analyzing module or the at least one voice signal received by the voice receiving unit.

42. The operating method of the voice control type bath system of claim 41, wherein when the mobile terminal answers or dials the phone call, volume of operating sound of the massage bath equipment is decreased or the massage bath equipment stops operating,
    when the phone call ends, the massage bath equipment is restored to a previous operation.

43. The operating method of the voice control type bath system of claim 40, wherein the voice control type bath system further comprises a second wireless communication module, and the operating method of the voice control type bath system further comprises:
    connecting the main control device to a remote server wirelessly via the second wireless communication module.

44. An operating method of a voice control type bath system, utilized for a massage bath equipment, the voice control type bath system comprising at least one attached device, a voice receiving unit, a voice analyzing module, and a main control device, the operating method of the voice control type bath system comprising:
    receiving at least one voice signal by the voice receiving unit;
    analyzing the at least one voice signal to generate at least one controlling command by the voice analyzing module; and
    controlling the at least one attached device to actuate the massage bath equipment according to the at least one controlling command of the voice analyzing module and/or controlling an actuation of the attached device according to the at least one controlling command of the voice analyzing module,
    wherein the voice receiving unit and the voice analyzing module are disposed in the main control device, the voice control type bath system further comprises a first wireless communication module and a mobile terminal, the operating method of the voice control type bath system further comprises:
    connecting the mobile terminal to the main control device wirelessly via the first wireless communication module and generating the at least one voice signal by the mobile terminal.

45. The operating method of the voice control type bath system of claim 44, further comprising:
    answering or dialing, by the mobile terminal, a phone call according to the at least one controlling command generated by the voice analyzing module or the at least one voice signal received by the voice receiving unit.

46. The operating method of the voice control type bath system of claim 45, wherein when the mobile terminal answers or dials the phone call, volume of operating sound of the massage bath equipment is decreased or the massage bath equipment stops operating,
    when the phone call ends, the massage bath equipment is restored to a previous operation.

* * * * *